(12) United States Patent
Merriman et al.

(10) Patent No.: US 10,084,218 B2
(45) Date of Patent: Sep. 25, 2018

(54) BATTERY PACK AND METHOD OF ASSEMBLING THE BATTERY PACK

(71) Applicant: LG Chem, Ltd., Seoul (KR)

(72) Inventors: Robert Merriman, Shelby Township, MI (US); Heekook Yang, Troy, MI (US)

(73) Assignee: LG Chem, Ltd., Seoul (KR)

( * ) Notice: Subject to any disclaimer, the term of this patent is extended or adjusted under 35 U.S.C. 154(b) by 348 days.

(21) Appl. No.: 14/273,572

(22) Filed: May 9, 2014

(65) Prior Publication Data

US 2015/0325894 A1 Nov. 12, 2015

(51) Int. Cl.
*H01M 10/6566* (2014.01)
*H01M 10/655* (2014.01)
(Continued)

(52) U.S. Cl.
CPC ..... *H01M 10/6566* (2015.04); *H01M 2/1061* (2013.01); *H01M 2/1077* (2013.01);
(Continued)

(58) Field of Classification Search
CPC ............. H01M 10/04; H01M 10/0413; H01M 10/425; H01M 10/613; H01M 10/647;
(Continued)

(56) References Cited

U.S. PATENT DOCUMENTS 1,587,425 A 6/1926 Otto
2,210,833 A 8/1940 Clough
(Continued)

FOREIGN PATENT DOCUMENTS

CN 1385917 A 12/2002
CN 101101997 A 1/2008
(Continued)

OTHER PUBLICATIONS

"Gasket". Merriam-Webster. Merriam-Webster. Web. May 30, 2012. <http://www.merriam-webster.com/dictionary/gasket>.
(Continued)

*Primary Examiner* — Lingwen R Zeng
(74) *Attorney, Agent, or Firm* — Buckert Patent & Trademark Law Firm PC; John F. Buckert

(57) ABSTRACT

A battery pack having a battery pack housing defining an interior region is provided. The housing further includes an inlet aperture and an outlet aperture communicating with the interior region. The battery pack further includes a battery module that is disposed in the interior region of the battery pack housing proximate to the inlet aperture. The battery module has a first battery cell, a heat exchanger, and first and second end plates. The first battery cell and the heat exchanger are disposed against one another, and are further disposed between the first and second end plates. The heat exchanger defines a first flow path portion therethrough. The first end plate has a first end portion that extends longitudinally past the first end of the first battery cell, and a second end portion that extends longitudinally past the second end of the first battery cell.

20 Claims, 18 Drawing Sheets

(51) Int. Cl.

| | |
|---|---|
| *H01M 10/6556* | (2014.01) |
| *H01M 2/10* | (2006.01) |
| *H01M 10/6563* | (2014.01) |
| *H01M 10/647* | (2014.01) |
| *H01M 10/6557* | (2014.01) |
| *H01M 10/613* | (2014.01) |
| *H01M 10/6551* | (2014.01) |
| *H01M 10/6555* | (2014.01) |
| H01M 10/04 | (2006.01) |
| H01M 10/42 | (2006.01) |
| H01M 10/667 | (2014.01) |

(52) U.S. Cl.
CPC ....... *H01M 10/613* (2015.04); *H01M 10/647* (2015.04); *H01M 10/655* (2015.04); *H01M 10/6551* (2015.04); *H01M 10/6555* (2015.04); *H01M 10/6556* (2015.04); *H01M 10/6557* (2015.04); *H01M 10/6563* (2015.04); *H01M 10/0413* (2013.01); *H01M 10/425* (2013.01); *H01M 10/667* (2015.04); *Y10T 29/4911* (2015.01)

(58) Field of Classification Search
CPC ........... H01M 10/655; H01M 10/6556; H01M 10/6557; H01M 10/6563; H01M 10/6566; H01M 2/1061; H01M 2/1077; H01M 10/6551; H01M 10/6555; H01M 10/667; Y10T 29/4911
See application file for complete search history.

(56) References Cited

U.S. PATENT DOCUMENTS

| | | |
|---|---|---|
| 2,273,244 A | 2/1942 | Cornelius |
| 2,391,859 A | 1/1946 | Earl |
| 3,503,558 A | 3/1970 | Galiulo et al. |
| 3,522,100 A | 7/1970 | Lindstrom |
| 3,550,681 A | 12/1970 | Stier et al. |
| 3,964,930 A | 6/1976 | Reiser |
| 4,009,752 A | 3/1977 | Wilson |
| 4,063,590 A | 12/1977 | Mcconnell |
| 4,298,904 A | 11/1981 | Koenig |
| 4,305,456 A | 12/1981 | Mueller et al. |
| 4,322,776 A | 3/1982 | Job et al. |
| 4,337,626 A | 7/1982 | Ibrahim |
| 4,444,994 A | 4/1984 | Baker et al. |
| 4,518,663 A | 5/1985 | Kodali et al. |
| 4,646,202 A | 2/1987 | Hook et al. |
| 4,701,829 A | 10/1987 | Bricaud et al. |
| 4,777,561 A | 10/1988 | Murphy et al. |
| 4,849,858 A | 7/1989 | Grapes et al. |
| 4,982,785 A | 1/1991 | Tomlinson |
| 4,995,240 A | 2/1991 | Barthel et al. |
| 5,057,968 A | 10/1991 | Morrison |
| 5,071,652 A | 12/1991 | Jones et al. |
| 5,186,250 A | 2/1993 | Ouchi et al. |
| 5,214,564 A | 5/1993 | Metzler et al. |
| 5,270,131 A | 12/1993 | Diethelm et al. |
| 5,275,012 A | 1/1994 | Dage et al. |
| 5,322,745 A | 6/1994 | Yanagihara et al. |
| 5,329,988 A | 7/1994 | Juger |
| 5,346,786 A | 9/1994 | Hodgetts |
| 5,356,735 A | 10/1994 | Meadows et al. |
| 5,392,873 A | 2/1995 | Masuyama et al. |
| 5,443,926 A | 8/1995 | Holland et al. |
| 5,510,203 A | 4/1996 | Hamada et al. |
| 5,520,976 A | 5/1996 | Giannetti et al. |
| 5,586,444 A | 12/1996 | Fung |
| 5,620,057 A | 4/1997 | Klemen et al. |
| 5,663,007 A | 9/1997 | Ikoma et al. |
| 5,678,421 A | 10/1997 | Maynard et al. |
| 5,736,836 A | 4/1998 | Hasegawa et al. |
| 5,756,227 A | 5/1998 | Suzuki et al. |
| 5,816,062 A | 10/1998 | Weng et al. |
| 5,834,132 A | 11/1998 | Hasegawa et al. |
| 5,937,664 A | 8/1999 | Matsuno et al. |
| 5,985,483 A | 11/1999 | Verhoog et al. |
| 6,087,036 A | 7/2000 | Rouillard et al. |
| 6,111,387 A | 8/2000 | Kouzu et al. |
| 6,159,630 A | 12/2000 | Wyser |
| 6,176,095 B1 | 1/2001 | Porter |
| 6,289,979 B1 | 9/2001 | Kato |
| 6,344,728 B1 | 2/2002 | Kouzu et al. |
| 6,362,598 B2 | 3/2002 | Laig-Hoerstebrock et al. |
| 6,399,238 B1 | 6/2002 | Oweis et al. |
| 6,422,027 B1 | 7/2002 | Coates, Jr. et al. |
| 6,448,741 B1 | 9/2002 | Inui et al. |
| 6,462,949 B1 | 10/2002 | Parish, IV et al. |
| 6,512,347 B1 | 1/2003 | Hellmann et al. |
| 6,569,556 B2 | 5/2003 | Zhou et al. |
| 6,662,891 B2 | 12/2003 | Misu et al. |
| 6,689,510 B1 | 2/2004 | Gow et al. |
| 6,696,197 B2 | 2/2004 | Inagaki et al. |
| 6,703,160 B2 | 3/2004 | Gao |
| 6,724,172 B2 | 4/2004 | Koo |
| 6,750,630 B2 | 6/2004 | Inoue et al. |
| 6,775,998 B2 | 8/2004 | Yuasa et al. |
| 6,780,538 B2 | 8/2004 | Hamada et al. |
| 6,821,671 B2 | 11/2004 | Hinton et al. |
| 6,826,948 B1 | 12/2004 | Bhatti et al. |
| 6,878,485 B2 | 4/2005 | Ovshinsky et al. |
| 6,982,131 B1 | 1/2006 | Hamada et al. |
| 7,070,874 B2 | 7/2006 | Blanchet et al. |
| 7,143,724 B2 | 12/2006 | Hashizumi et al. |
| 7,150,935 B2 | 12/2006 | Hamada et al. |
| 7,250,741 B2 | 7/2007 | Koo et al. |
| 7,251,954 B2 | 8/2007 | Fee et al. |
| 7,264,902 B2 | 9/2007 | Horie et al. |
| 7,278,389 B2 | 10/2007 | Kirakosyan |
| 7,309,279 B2 | 12/2007 | Sharp et al. |
| 7,467,525 B1 | 12/2008 | Ohta et al. |
| 7,531,270 B2 | 5/2009 | Buck et al. |
| 7,591,303 B2 | 9/2009 | Zeigler et al. |
| 7,795,845 B2 | 9/2010 | Cho |
| 7,797,958 B2 | 9/2010 | Alston et al. |
| 7,816,029 B2 | 10/2010 | Takamatsu et al. |
| 7,846,573 B2 | 12/2010 | Kelly |
| 7,879,480 B2 | 2/2011 | Yoon et al. |
| 7,883,793 B2 | 2/2011 | Niedzwiecki et al. |
| 7,976,978 B2 | 7/2011 | Shin et al. |
| 7,981,538 B2 | 7/2011 | Kim et al. |
| 7,997,367 B2 | 8/2011 | Nakamura |
| 8,007,915 B2 | 8/2011 | Kurachi |
| 8,011,467 B2 | 9/2011 | Asao et al. |
| 8,030,886 B2 | 10/2011 | Mahalingam et al. |
| 8,067,111 B2 | 11/2011 | Koetting et al. |
| 8,209,991 B2 | 7/2012 | Kondou et al. |
| 8,409,743 B2 | 4/2013 | Okada et al. |
| 8,663,829 B2 | 3/2014 | Koetting et al. |
| 9,184,424 B2 | 11/2015 | Arena et al. |
| 2001/0026886 A1 | 10/2001 | Inui et al. |
| 2001/0054293 A1 | 12/2001 | Gustafson et al. |
| 2002/0012833 A1 | 1/2002 | Gow et al. |
| 2002/0073726 A1 | 6/2002 | Hasebe et al. |
| 2002/0086201 A1 | 7/2002 | Payen et al. |
| 2002/0182493 A1 | 12/2002 | Ovshinsky et al. |
| 2003/0017384 A1 | 1/2003 | Marukawa et al. |
| 2003/0067747 A1 | 4/2003 | Hasegawa et al. |
| 2003/0080714 A1 | 5/2003 | Inoue et al. |
| 2003/0189104 A1 | 10/2003 | Watanabe et al. |
| 2003/0211384 A1 | 11/2003 | Hamada et al. |
| 2004/0069474 A1 | 4/2004 | Wu et al. |
| 2004/0121205 A1 | 6/2004 | Blanchet |
| 2004/0237550 A1 | 12/2004 | Yamasaki et al. |
| 2005/0026014 A1 | 2/2005 | Fogaing et al. |
| 2005/0089750 A1 | 4/2005 | Ng et al. |
| 2005/0103486 A1 | 5/2005 | Demuth et al. |
| 2005/0110460 A1 | 5/2005 | Arai et al. |
| 2005/0111167 A1* | 5/2005 | Yamaguchi ....... H01M 10/6563 361/676 |
| 2005/0134038 A1 | 6/2005 | Walsh |
| 2006/0234119 A1 | 10/2006 | Kruger et al. |

(56) References Cited

U.S. PATENT DOCUMENTS

| | | |
|---|---|---|
| 2006/0286450 A1 | 12/2006 | Yoon et al. |
| 2007/0012055 A1 | 1/2007 | Schenk et al. |
| 2007/0062681 A1 | 3/2007 | Beech |
| 2007/0072066 A1 | 3/2007 | Yoon et al. |
| 2007/0087266 A1 | 4/2007 | Bourke et al. |
| 2007/0095073 A1 | 5/2007 | Tian et al. |
| 2007/0141453 A1* | 6/2007 | Mahalingam ......... H01M 10/42 429/120 |
| 2007/0209378 A1 | 9/2007 | Larson |
| 2007/0227166 A1 | 10/2007 | Rafalovich et al. |
| 2008/0003491 A1 | 1/2008 | Yahnker et al. |
| 2008/0041079 A1 | 2/2008 | Nishijima et al. |
| 2008/0090137 A1 | 4/2008 | Buck et al. |
| 2008/0110189 A1 | 5/2008 | Alston et al. |
| 2008/0110606 A1 | 5/2008 | Gorbounov et al. |
| 2008/0182151 A1 | 7/2008 | Mizusaki et al. |
| 2008/0196957 A1 | 8/2008 | Koike et al. |
| 2008/0226976 A1 | 9/2008 | Stimits |
| 2008/0248338 A1 | 10/2008 | Yano et al. |
| 2008/0299446 A1 | 12/2008 | Kelly |
| 2008/0314071 A1 | 12/2008 | Ohta et al. |
| 2009/0061299 A1 | 3/2009 | Uchida et al. |
| 2009/0074478 A1 | 3/2009 | Kurachi |
| 2009/0087727 A1 | 4/2009 | Harada et al. |
| 2009/0104512 A1 | 4/2009 | Fassnacht et al. |
| 2009/0123819 A1 | 5/2009 | Kim |
| 2009/0142653 A1 | 6/2009 | Okada et al. |
| 2009/0155680 A1 | 6/2009 | Maguire et al. |
| 2009/0186265 A1 | 7/2009 | Koetting et al. |
| 2009/0258288 A1 | 10/2009 | Weber et al. |
| 2009/0258289 A1 | 10/2009 | Weber et al. |
| 2009/0280395 A1 | 11/2009 | Nemesh et al. |
| 2009/0325051 A1 | 12/2009 | Niedzwiecki et al. |
| 2009/0325052 A1 | 12/2009 | Koetting et al. |
| 2009/0325054 A1 | 12/2009 | Payne et al. |
| 2009/0325055 A1 | 12/2009 | Koetting et al. |
| 2009/0325059 A1 | 12/2009 | Niedzwiecki et al. |
| 2010/0112419 A1 | 5/2010 | Jang et al. |
| 2010/0203376 A1 | 8/2010 | Choi et al. |
| 2010/0209760 A1 | 8/2010 | Yoshihara et al. |
| 2010/0262791 A1 | 10/2010 | Gilton |
| 2010/0275619 A1 | 11/2010 | Koetting et al. |
| 2010/0276132 A1 | 11/2010 | Payne |
| 2010/0279152 A1 | 11/2010 | Payne |
| 2010/0279154 A1 | 11/2010 | Koetting et al. |
| 2010/0304203 A1 | 12/2010 | Buck et al. |
| 2010/0307723 A1 | 12/2010 | Thomas et al. |
| 2011/0000241 A1 | 1/2011 | Favaretto |
| 2011/0020676 A1 | 1/2011 | Kurosawa |
| 2011/0027631 A1 | 2/2011 | Koenigsmann |
| 2011/0027640 A1 | 2/2011 | Gadawski et al. |
| 2011/0041525 A1 | 2/2011 | Kim et al. |
| 2011/0045326 A1 | 2/2011 | Leuthner et al. |
| 2011/0052959 A1 | 3/2011 | Koetting et al. |
| 2011/0052960 A1 | 3/2011 | Kwon et al. |
| 2011/0189523 A1 | 8/2011 | Eom |
| 2011/0189525 A1 | 8/2011 | Palanchon et al. |
| 2011/0189531 A1* | 8/2011 | Kim ......... H01M 10/625 429/156 |
| 2011/0293982 A1 | 12/2011 | Martz et al. |
| 2011/0293983 A1 | 12/2011 | Oury et al. |
| 2011/0293985 A1 | 12/2011 | Champion et al. |
| 2012/0040223 A1 | 2/2012 | Odumodu |
| 2012/0082880 A1 | 4/2012 | Koetting et al. |
| 2012/0141847 A1 | 6/2012 | Amagai et al. |
| 2012/0156537 A1 | 6/2012 | Meintschel et al. |
| 2012/0156542 A1 | 6/2012 | Schaefer et al. |
| 2012/0171543 A1 | 7/2012 | Hirsch et al. |
| 2012/0181827 A1 | 7/2012 | Aoki et al. |
| 2012/0183830 A1 | 7/2012 | Schaefer et al. |
| 2012/0231316 A1 | 9/2012 | Sohn |
| 2013/0045410 A1 | 2/2013 | Yang et al. |
| 2013/0071720 A1 | 3/2013 | Zahn |
| 2013/0078487 A1 | 3/2013 | Shin et al. |
| 2013/0084480 A1* | 4/2013 | Kim ................... H01M 2/1072 429/99 |
| 2013/0115505 A1 | 5/2013 | Xie |
| 2013/0136136 A1 | 5/2013 | Ando et al. |
| 2013/0189557 A1 | 7/2013 | Haussmann |
| 2013/0255293 A1 | 10/2013 | Gadawski et al. |
| 2013/0309542 A1 | 11/2013 | Merriman et al. |
| 2014/0050953 A1 | 2/2014 | Yoon et al. |
| 2014/0050966 A1 | 2/2014 | Merriman et al. |
| 2014/0120390 A1 | 5/2014 | Merriman et al. |
| 2014/0147709 A1 | 5/2014 | Ketkar et al. |
| 2014/0227575 A1 | 8/2014 | Ketkar |
| 2014/0308558 A1 | 10/2014 | Merriman et al. |
| 2014/0322563 A1 | 10/2014 | Ketkar et al. |
| 2014/0335390 A1 | 11/2014 | Hwang et al. |
| 2015/0010801 A1 | 1/2015 | Arena et al. |
| 2015/0207187 A1 | 7/2015 | Beltz et al. |
| 2016/0104874 A1 | 4/2016 | Arena |
| 2016/0111691 A1 | 4/2016 | Garascia et al. |
| 2016/0126523 A1 | 5/2016 | Arena et al. |

FOREIGN PATENT DOCUMENTS

| | | |
|---|---|---|
| CN | 1754279 B | 9/2010 |
| CN | 201859929 U | 6/2011 |
| CN | 102263216 B | 3/2014 |
| CN | 102396098 B | 4/2014 |
| DE | 19639115 A | 3/1998 |
| DE | 102008034860 A1 | 1/2010 |
| DE | 102009006426 A1 | 7/2010 |
| DE | 102010021922 A1 | 12/2011 |
| EP | 1538885 B1 | 8/2005 |
| EP | 1577966 A | 9/2005 |
| EP | 1852925 A | 11/2007 |
| EP | 2200109 A2 | 6/2010 |
| EP | 2065963 B1 | 8/2010 |
| EP | 2262048 A | 12/2010 |
| EP | 2565960 A1 | 3/2013 |
| GB | 481891 A | 3/1938 |
| JP | 08111244 A | 4/1996 |
| JP | H09129213 A | 5/1997 |
| JP | 19970199186 | 7/1997 |
| JP | H09219213 A | 8/1997 |
| JP | 2001023703 | 1/2001 |
| JP | 2001105843 A | 4/2001 |
| JP | 2002038033 A | 2/2002 |
| JP | 2002319383 A | 10/2002 |
| JP | 2002333255 A | 11/2002 |
| JP | 2003188323 A | 7/2003 |
| JP | 2003282112 A | 10/2003 |
| JP | 2004333115 A | 11/2004 |
| JP | 2005126315 A | 5/2005 |
| JP | 2005147443 A | 6/2005 |
| JP | 2005349955 A | 12/2005 |
| JP | 2006512731 | 4/2006 |
| JP | 2006125835 | 5/2006 |
| JP | 2006139928 A | 6/2006 |
| JP | 2007107684 | 4/2007 |
| JP | 2007305425 A | 11/2007 |
| JP | 2008054379 A | 3/2008 |
| JP | 2008062875 A | 3/2008 |
| JP | 2008080995 A | 4/2008 |
| JP | 2008159439 | 7/2008 |
| JP | 2008159440 A | 7/2008 |
| JP | 2008251378 | 10/2008 |
| JP | 2009009889 A | 1/2009 |
| JP | 2009021067 A | 1/2009 |
| JP | 2009054297 A | 3/2009 |
| JP | 2009158316 | 7/2009 |
| JP | 2009238644 | 10/2009 |
| JP | 2012015096 | 10/2009 |
| JP | 2012064555 | 10/2010 |
| JP | 2012018915 | 1/2012 |
| JP | 2013110087 | 6/2013 |
| JP | 2014235900 | 1/2014 |
| KR | 20050092605 A | 9/2005 |
| KR | 100637472 B1 | 10/2006 |
| KR | 100948003 | 8/2007 |
| KR | 100765659 B1 | 10/2007 |

(56) References Cited

FOREIGN PATENT DOCUMENTS

| | | | |
|---|---|---|---|
| KR | 20080047641 A | 5/2008 | |
| KR | 20090000307 | 1/2009 | |
| KR | 20090082212 A | 7/2009 | |
| KR | 100921346 B1 | 10/2009 | |
| KR | 20090107443 A | 10/2009 | |
| KR | 101156527 | 6/2010 | |
| KR | 101069161 | 7/2010 | |
| KR | 20100119497 A | 9/2010 | |
| KR | 20100119498 A | 9/2010 | |
| KR | 1020100119497 | 9/2010 | |
| KR | 20100115709 A | 10/2010 | |
| KR | 1020100119498 A | 11/2010 | |
| KR | 20110013269 | 2/2011 | |
| KR | 1020110013269 A | 2/2011 | |
| KR | 1020110013270 A | 2/2011 | |
| KR | 20120129384 | 5/2011 | |
| KR | 20110116529 A | 10/2011 | |
| KR | 20110126764 | 11/2011 | |
| KR | 20130018494 | 5/2012 | |
| KR | 20120088020 | 8/2012 | |
| KR | 20130024761 | 8/2012 | |
| KR | 20130017289 | 2/2013 | |
| KR | 20130073582 | 7/2013 | |
| KR | 20140010234 | 1/2014 | |
| KR | 20130033531 | 4/2014 | |
| KR | 20140114551 | 9/2014 | |
| WO | 2006083446 A2 | 8/2006 | |
| WO | 2006101343 A | 9/2006 | |
| WO | 2007007503 A | 1/2007 | |
| WO | 2007043510 A1 | 4/2007 | |
| WO | 2007115743 A2 | 10/2007 | |
| WO | 2008111162 A | 9/2008 | |
| WO | 2009073225 A | 6/2009 | |
| WO | 2011040130 A1 | 4/2011 | |
| WO | 2011145830 A2 | 11/2011 | |
| WO | 2011146919 A2 | 11/2011 | |
| WO | 2011147550 A1 | 12/2011 | |
| WO | 2013025608 A1 | 2/2013 | |
| WO | 2013081396 A1 | 6/2013 | |

OTHER PUBLICATIONS

International Search Report; International Application No. PCT/KR2009/000258; International Filing Date: Jan. 16, 2009; dated Aug. 28, 2009; 2 pages.
International Search Report; International Application No. PCT/KR2009/003428, International Filing Date: Jun. 25, 2009; dated Jan. 22, 2010; 2 pages.
International Search Report; International Application No. PCT/KR2009/003429; International Filing Date: Jun. 25, 2009; dated Jan. 12, 2010; 3 pages.
International Search Report; International Application No. PCT/KR2009/003430; International Filing Date: Jun. 25, 2009; dated Feb. 3, 2010; 2 pages.
International Search Report; International Application No. PCT/KR2009/003434; International Filing Date: Jun. 25, 2009; dated Jan. 18, 2010; 2 pages.
International Search Report; International Application No. PCT/KR2009/003436; International Filing Date: Jun. 25, 2009; dated Jan. 22, 2010; 2 pages.
International Search Report; International Application No. PCT/KR2009/006121; International Filing Date: Oct. 22, 2009; dated May 3, 2010; 2 pages.
International Search Report; International Application No. PCT/KR2010/002334; International Filing Date: Apr. 15, 2010; dated Nov. 29, 2010; 2 pages.
International Search Report; International Application No. PCT/KR2010/002336; International Filing Date: Apr. 15, 2010; dated Jan. 31, 2011; 2 pages.
International Search Report; International Application No. PCT/KR2010/002337; International Filing Date: Apr. 15, 2010; dated May 3, 2010; 2 pages.
International Search Report; International Application No. PCT/KR2010/002340; International Filing Date: Apr. 15, 2010; dated Jan. 31, 2011; 2 pages.
International Search Report; International Application No. PCT/KR2010/004944; International Filing Date: Jul. 28, 2010; dated Apr. 29, 2011; 2 pages.
International Search Report; International Application No. PCT/KR2010/005639; International Filing Date: Aug. 24, 2010; dated Jun. 3, 2011; 2 pages.
U.S. Appl. No. 13/766,162, filed Feb. 13, 2013 entitled Battery Cell Assembly and Method for Manufacturing the Battery Cell Assembly.
U.S. Appl. No. 13/861,426, filed Apr. 12, 2013 entitled Battery Cell Assembly and Method for Manufacturing a Cooling Fin for the Battery Cell Assembly.
U.S. Appl. No. 13/936,556, filed Jul. 8, 2013 entitled Battery Assembly.
U.S. Appl. No. 14/059,547, filed Oct. 22, 2013 entitled Battery Cell Assembly.
U.S. Appl. No. 14/273,586, filed May 9, 2014 entitled Battery Module and Method of Assembling the Battery Module.
U.S. Appl. No. 13/686,018, filed Nov. 27, 2012 entitled Battery System and Method for Cooling a Battery Cell Assembly.
International Search Report for International application No. PCT/KR2013/004015 dated Sep. 26, 2013.
Written Opinion for International application No. PCT/KR2013002597 dated Feb. 2, 2015.
Written Opinion for International application No. PCT/KR2014/002090 dated May 26, 2014.
European Search Report; European Application No. 15789722, European Filing Date: Jan. 30, 2017.

* cited by examiner

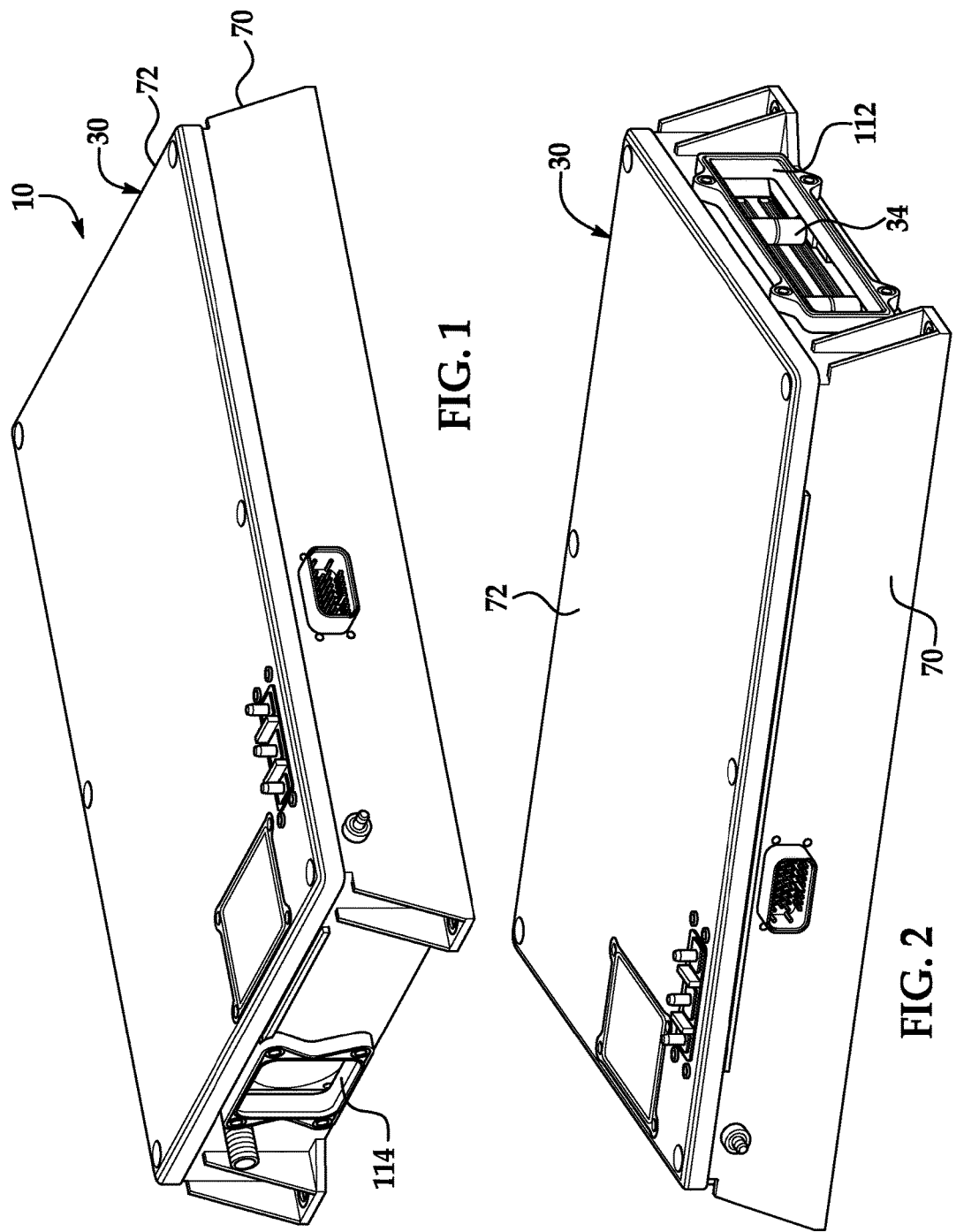

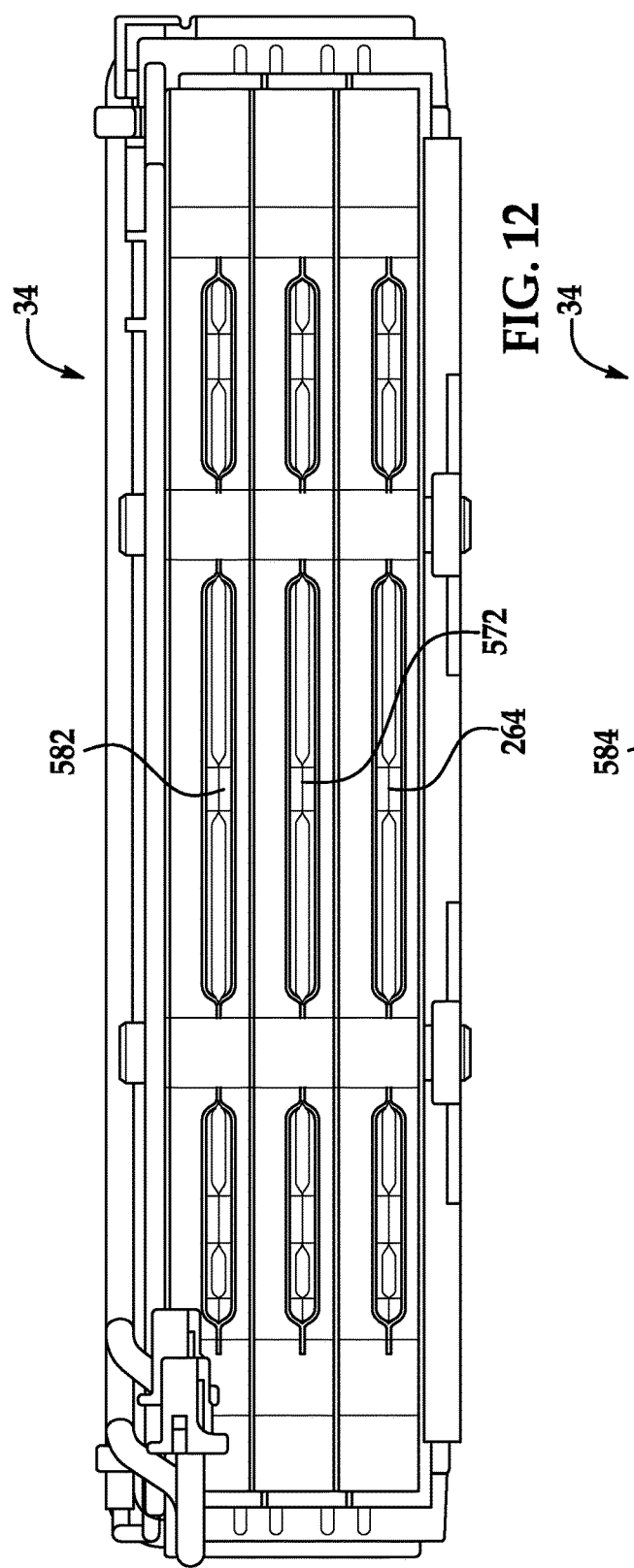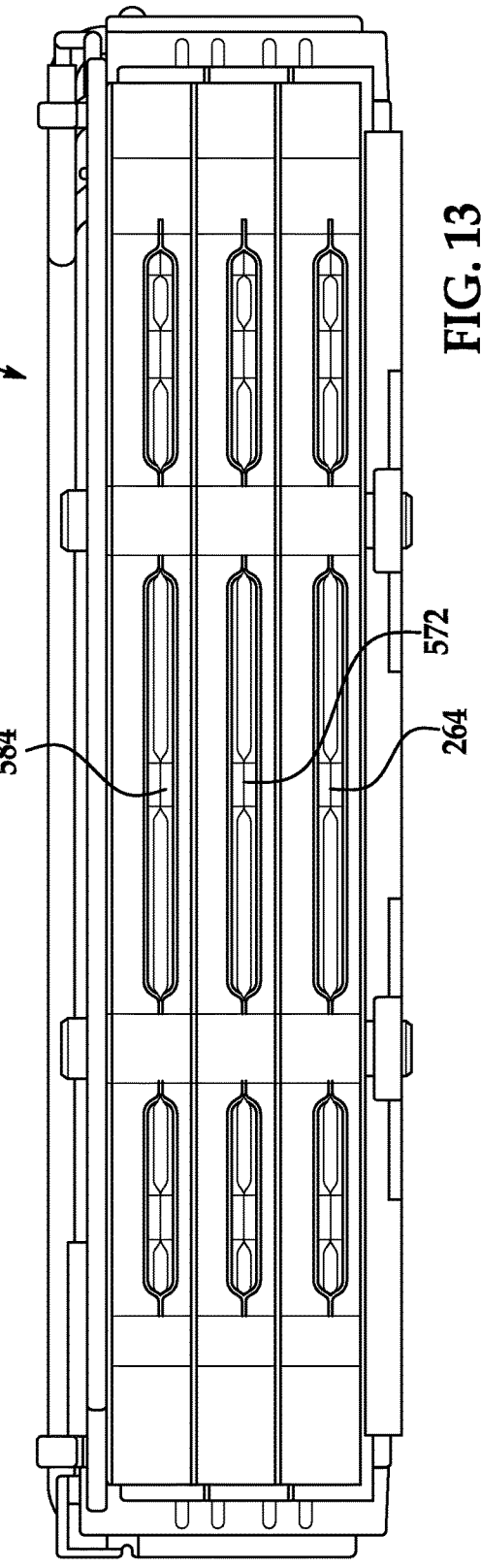

```
┌─────────────────────────────────────────────────────────────────┐
│ USER PROVIDES A BATTERY PACK HOUSING, A BATTERY MODULE, A       │
│ THERMALLY CONDUCTIVE HOUSING, AND AN ELECTRIC FAN; THE BATTERY  │
│ PACK HOUSING DEFINING AN INTERIOR REGION, THE BATTERY PACK      │
│ HOUSING FURTHER HAVING AN INLET APERTURE AND AN OUTLET APERTURE │
│ FLUIDLY COMMUNICATING WITH THE INTERIOR REGION; THE BATTERY     │
│ MODULE HAVING A FIRST BATTERY CELL, A HEAT EXCHANGER, AND FIRST │
│ AND SECOND END PLATES; THE FIRST BATTERY CELL AND THE HEAT      │
│ EXCHANGER BEING DISPOSED AGAINST ONE ANOTHER, AND BEING FURTHER │
│ DISPOSED BETWEEN THE FIRST AND SECOND END PLATES; THE HEAT      │  930
│ EXCHANGER DEFINING A FIRST FLOW PATH PORTION THERETHROUGH; THE  │
│ FIRST BATTERY CELL HAVING A FIRST END AND A SECOND END; THE     │
│ FIRST END PLATE EXTENDING SUBSTANTIALLY PARALLEL TO A           │
│ LONGITUDINAL AXIS OF THE BATTERY MODULE, THE FIRST END PLATE    │
│ HAVING A FIRST END PORTION AND A SECOND END PORTION, THE FIRST  │
│ END PORTION OF THE FIRST END PLATE EXTENDING LONGITUDINALLY     │
│ PAST THE FIRST END OF THE FIRST BATTERY CELL; THE SECOND END    │
│ PORTION OF THE FIRST END PLATE EXTENDING LONGITUDINALLY PAST    │
│ THE SECOND END OF THE FIRST BATTERY CELL; THE SECOND END PLATE  │
│ EXTENDING SUBSTANTIALLY PARALLEL TO THE LONGITUDINAL AXIS OF    │
│ THE BATTERY MODULE, THE SECOND END PLATE HAVING A FIRST END     │
│ PORTION AND A SECOND END PORTION, THE FIRST END PORTION OF THE  │
│ SECOND END PLATE EXTENDING LONGITUDINALLY PAST THE FIRST END OF │
│ THE FIRST BATTERY CELL; THE SECOND END PORTION OF THE SECOND    │
│ END PLATE EXTENDING LONGITUDINALLY PAST THE SECOND END OF THE   │
│ FIRST BATTERY CELL                                              │
└─────────────────────────────────────────────────────────────────┘
                                 │
                                 ▼
┌─────────────────────────────────────────────────────────────────┐
│ USER DISPOSES THE BATTERY MODULE IN THE INTERIOR REGION OF THE  │  932
│ BATTERY PACK HOUSING PROXIMATE TO THE INLET APERTURE            │
└─────────────────────────────────────────────────────────────────┘
                                 │
                                 ▼
┌─────────────────────────────────────────────────────────────────┐
│ USER DISPOSES THE THERMALLY CONDUCTIVE HOUSING IN THE INTERIOR  │
│ REGION OF THE BATTERY PACK HOUSING BETWEEN THE BATTERY MODULE   │
│ AND THE OUTLET APERTURE OF THE BATTERY PACK HOUSING; THE        │  934
│ THERMALLY CONDUCTIVE HOUSING DEFINING A SECOND FLOW PATH        │
│ PORTION BETWEEN THE THERMALLY CONDUCTIVE HOUSING AND THE        │
│ BATTERY PACK HOUSING, THE SECOND FLOW PATH PORTION FLUIDLY      │
│ COMMUNICATING WITH THE FIRST FLOW PATH PORTION                  │
└─────────────────────────────────────────────────────────────────┘
                                 │
                                 ▼
┌─────────────────────────────────────────────────────────────────┐
│ USER DISPOSES AN ELECTRIC FAN IN THE INTERIOR REGION OF THE     │
│ BATTERY PACK HOUSING PROXIMATE TO THE OUTLET APERTURE OF THE    │
│ BATTERY PACK HOUSING; THE ELECTRIC FAN ADAPTED TO URGE AIR TO   │  936
│ FLOW THROUGH THE INLET APERTURE AND THROUGH THE FIRST AND       │
│ SECOND FLOW PATH PORTIONS AND FURTHER THROUGH A PORTION OF THE  │
│ ELECTRIC FAN AND THROUGH THE OUTLET APERTURE OF THE BATTERY     │
│ PACK HOUSING                                                    │
└─────────────────────────────────────────────────────────────────┘
```

FIG. 28

BATTERY PACK AND METHOD OF ASSEMBLING THE BATTERY PACK

BACKGROUND

The inventors herein have recognized a need for an improved battery pack and a method of assembling the battery pack.

SUMMARY

A battery pack in accordance with an exemplary embodiment is provided. The battery pack includes a battery pack housing defining an interior region. The battery pack housing further includes an inlet aperture and an outlet aperture communicating with the interior region. The battery pack further includes a battery module that is disposed in the interior region of the battery pack housing proximate to the inlet aperture. The battery module has a first battery cell, a heat exchanger, and first and second end plates. The first battery cell and the heat exchanger are disposed against one another, and are further disposed between the first and second end plates. The heat exchanger defines a first flow path portion therethrough. The first battery cell has a first end and a second end. The first end plate extends substantially parallel to a longitudinal axis of the battery module toward the inlet aperture. The first end plate has a first end portion and a second end portion. The first end portion of the first end plate extends longitudinally past the first end of the first battery cell. The second end portion of the first end plate extends longitudinally past the second end of the first battery cell. The second end plate extends substantially parallel to the longitudinal axis of the battery module. The second end plate has a first end portion and a second end portion. The first end portion of the second end plate extends longitudinally past the first end of the first battery cell toward the inlet aperture. The second end portion of the second end plate extends longitudinally past the second end of the first battery cell. The battery pack further includes a thermally conductive housing that is disposed in the interior region of the battery pack housing between the battery module and the outlet aperture of the battery pack housing. The thermally conductive housing defines a second flow path portion between the thermally conductive housing and the battery pack housing. The second flow path portion fluidly communicates with the first flow path portion. The battery pack further includes an electric fan disposed in the interior region of the battery pack housing. The electric fan is adapted to urge air to flow through the inlet aperture and through the first and second flow path portions and further through a portion of the electric fan and through the outlet aperture of the battery pack housing.

A method for assembling a battery pack in accordance with another exemplary embodiment is provided. The method includes providing a battery pack housing, a battery module, a thermally conductive housing, and an electric fan. The battery pack housing defines an interior region. The battery pack housing further includes an inlet aperture and an outlet aperture communicating with the interior region. The battery module has a first battery cell, a heat exchanger, and first and second end plates. The first battery cell and the heat exchanger are disposed against one another, and are further disposed between the first and second end plates. The heat exchanger defines a first flow path portion therethrough. The first battery cell has a first end and a second end. The first end plate extends substantially parallel to a longitudinal axis of the battery module. The first end plate has a first end portion and a second end portion. The first end portion of the first end plate extends longitudinally past the first end of the first battery cell. The second end portion of the first end plate extends longitudinally past the second end of the first battery cell. The second end plate extends substantially parallel to the longitudinal axis of the battery module. The second end plate has a first end portion and a second end portion. The first end portion of the second end plate extends longitudinally past the first end of the first battery cell. The second end portion of the second end plate extends longitudinally past the second end of the first battery cell. The method further includes disposing the battery module in the interior region of the battery pack housing proximate to the inlet aperture. The method further includes disposing the thermally conductive housing in the interior region of the battery pack housing between the battery module and the outlet aperture of the battery pack housing. The thermally conductive housing defines a second flow path portion between the thermally conductive housing and the battery pack housing. The second flow path portion fluidly communicates with the first flow path portion. The method further includes disposing the electric fan in the interior region of the battery pack housing. The electric fan is adapted to urge air to flow through the inlet aperture and through the first and second flow path portions and further through a portion of the electric fan and through the outlet aperture of the battery pack housing.

BRIEF DESCRIPTION OF THE DRAWINGS

FIG. 1 is a schematic of a battery pack in accordance with an exemplary embodiment;

FIG. 2 is another schematic of the battery pack of FIG. 1;

FIG. 12 is a schematic of a first side of the battery module of FIG. 7 illustrating ends of first, second, and third heat exchangers;

FIG. 13 is a schematic of a second side of the battery module of FIG. 7 illustrating ends of first, second, and third heat exchangers;

FIG. 28 is a flowchart of a method of assembling a battery pack in accordance with another exemplary embodiment.

DETAILED DESCRIPTION

Figure 3:
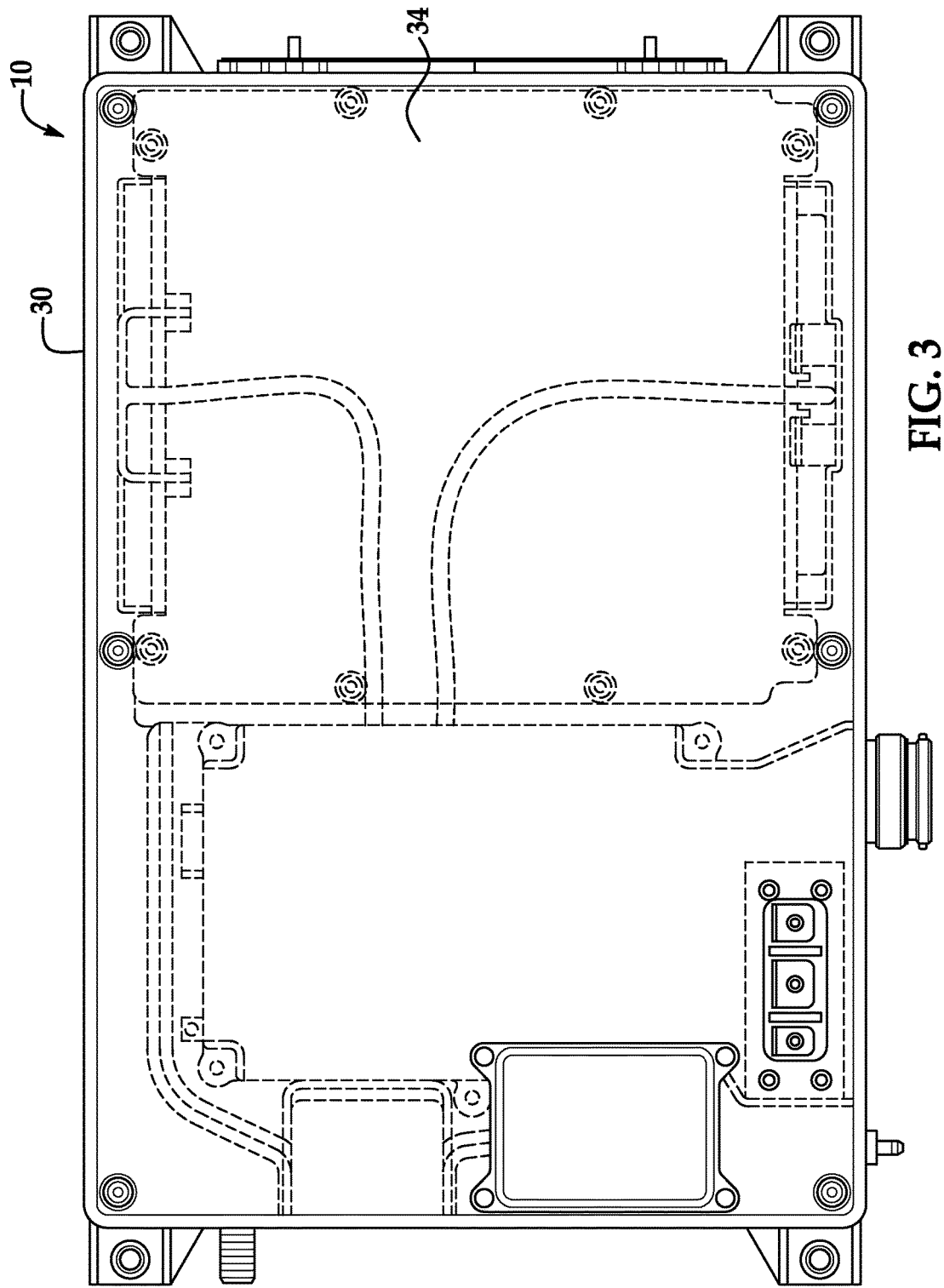
FIG. 3 is a partially transparent top view of the battery pack of FIG. 1.
Figure 4:
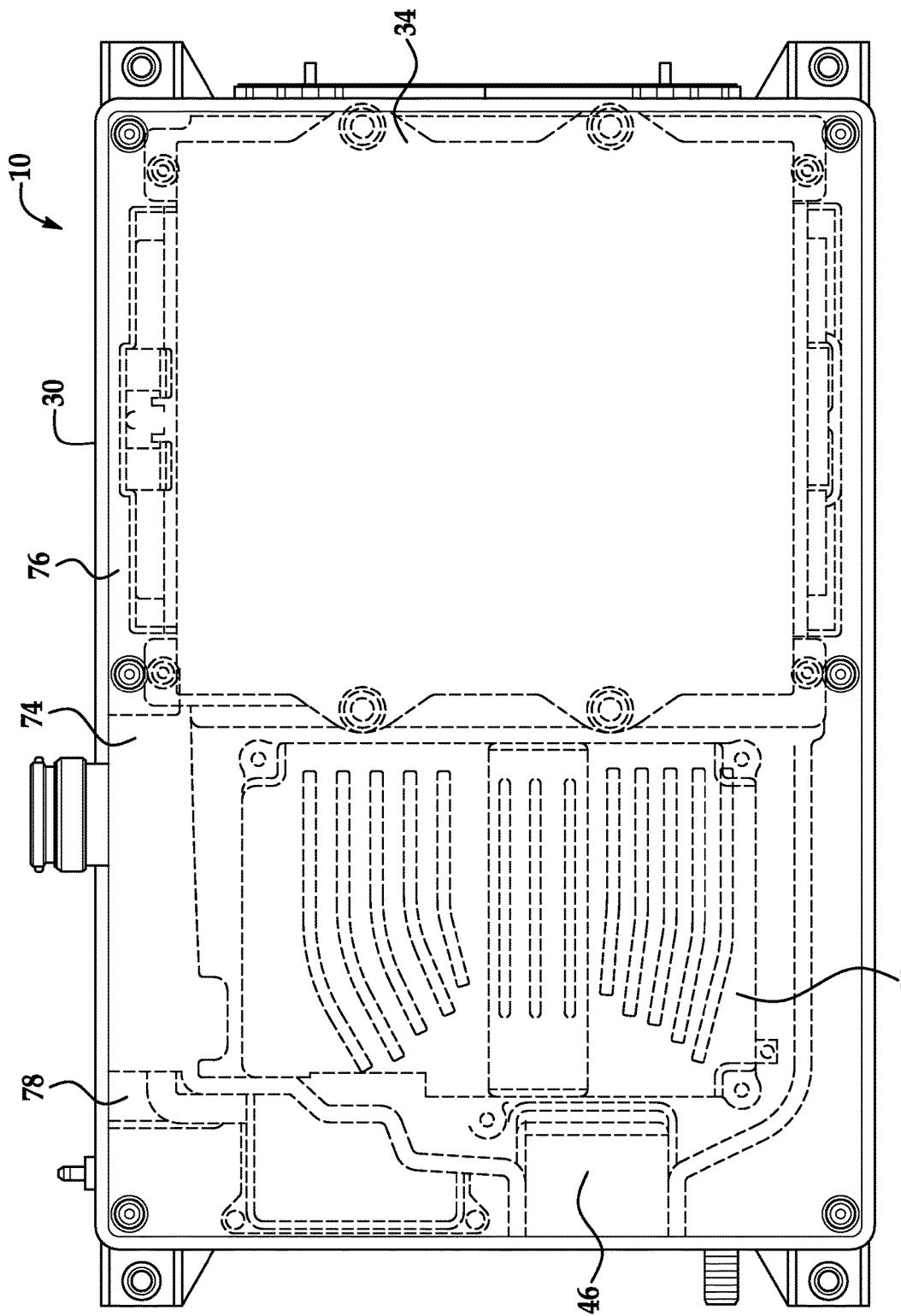
FIG. 4 is a partially transparent bottom view of the battery pack of FIG. 1.

Referring to FIGS. 1-6, a battery pack 10 in accordance with an exemplary embodiment is provided. The battery pack 10 includes a battery pack housing 30, a battery module 34, a thermally conductive housing 38, a DC/DC voltage converter 42, and an electric fan 46. An advantage of the battery pack 10 is that the battery pack 10 has the battery module 34 with end plates 230, 232 that extend past internal battery cells to direct air into heat exchangers contacting the battery cells. Thus, the battery pack 10 does not need a separate air manifold to direct air into heat exchangers contacting the battery cells.

Figure 5:
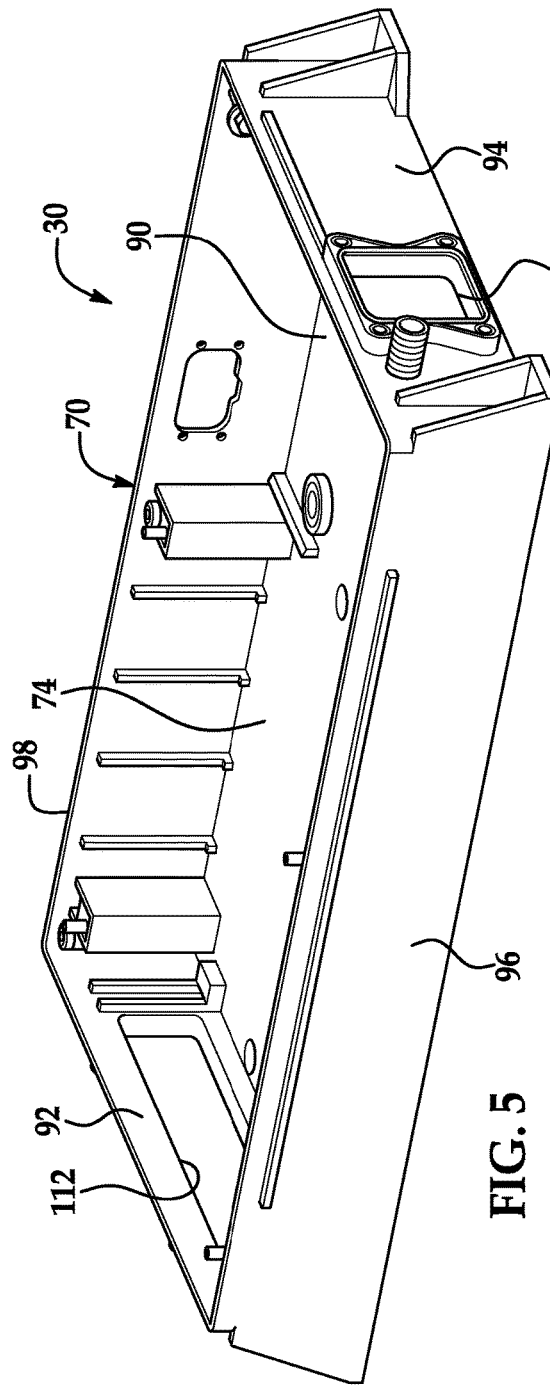
FIG. 5 is a schematic of a base portion of a battery pack housing utilized in the battery pack of FIG. 1.

Referring to FIGS. 1, 2 and 5, the battery pack housing 30 is provided to hold the remaining components of the battery pack 10 therein. The battery pack housing 30 has a base portion 70 and an upper cover 72 which define an interior region 74. The interior region 74 includes an interior space 76 and an interior space 78.

Referring to FIG. 5, the base portion 70 includes a bottom wall 90 and side walls 92, 94, 96, 98. The side walls 92, 94, 96, 98 are coupled to the bottom wall 90 and extend upwardly substantially perpendicular to the bottom wall 90. The side walls 92, 94 extend substantially parallel to one another. Further, the side walls 96, 98 extend substantially parallel to one another and perpendicular to the side walls 92, 94. The side wall 92 includes an inlet aperture 112 extending therethrough, and the side wall 94 includes an outlet aperture 114 extending therethrough. In an exemplary embodiment, the base portion 70 is constructed of steel or aluminum. In an alternative embodiment, the base portion 70 is constructed of plastic.

The upper cover 72 is removably coupled to the side walls 92, 94, 96, 98 to enclose the interior region 74. In an exemplary embodiment, the upper cover 72 is constructed of steel or aluminum. In an alternative embodiment, the upper cover 72 is constructed of plastic.

Referring to FIGS. 5-11, the battery module 34 is disposed in the interior space 76 of the interior region 74 of the battery pack housing 30 proximate to the inlet aperture 112. The battery module 34 includes frame members 120, 124, 128, an insulating layer 140, battery cells 150, 154, 158, 162, 166, 170, 180, 184, 188, 192, 196, 200, battery cell interconnect assemblies 220, 222, and end plates 230, 232.

Figure 7:
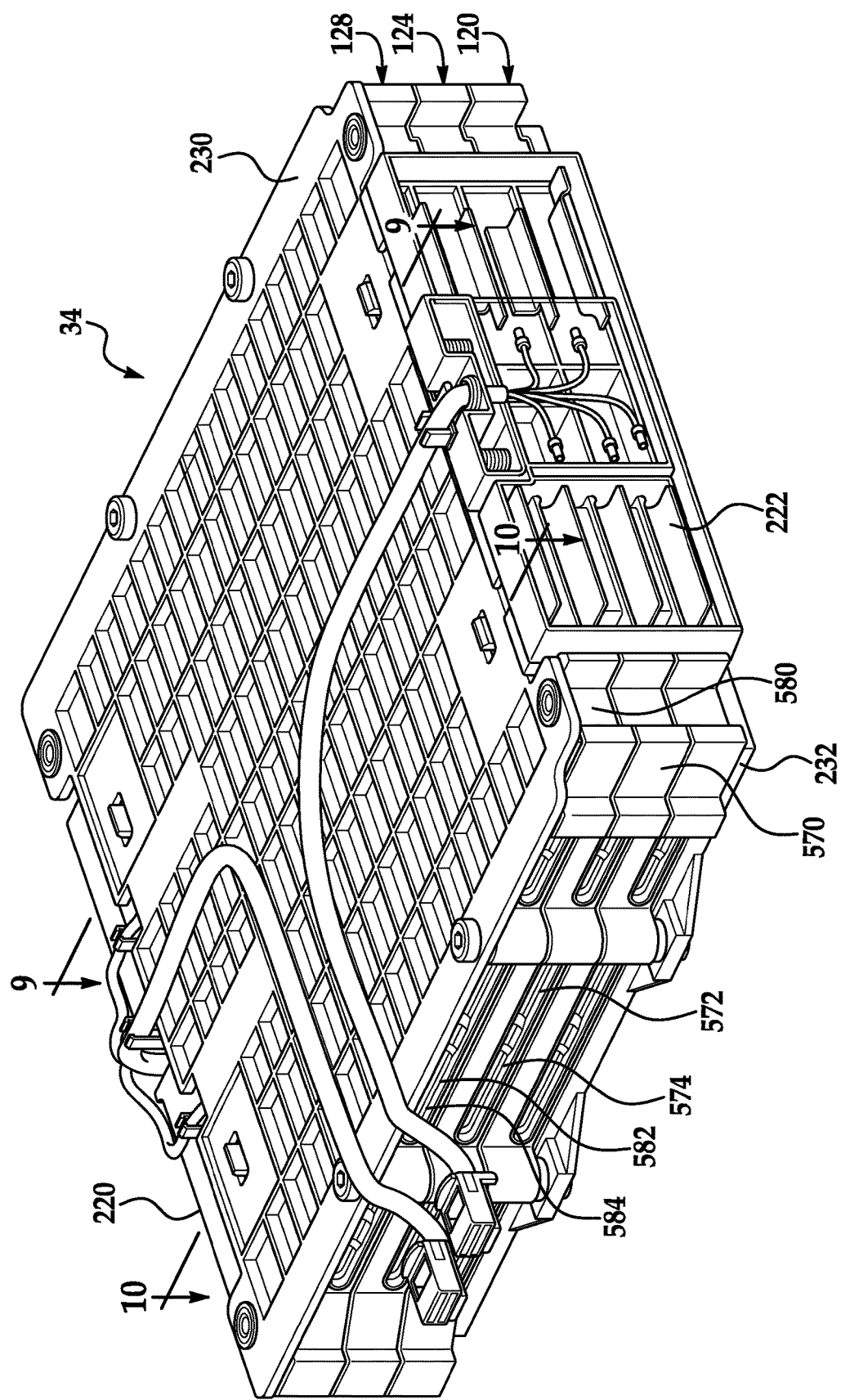
FIG. 7 is a schematic of a battery module utilized in the battery pack of FIG. 1.
Figure 8:
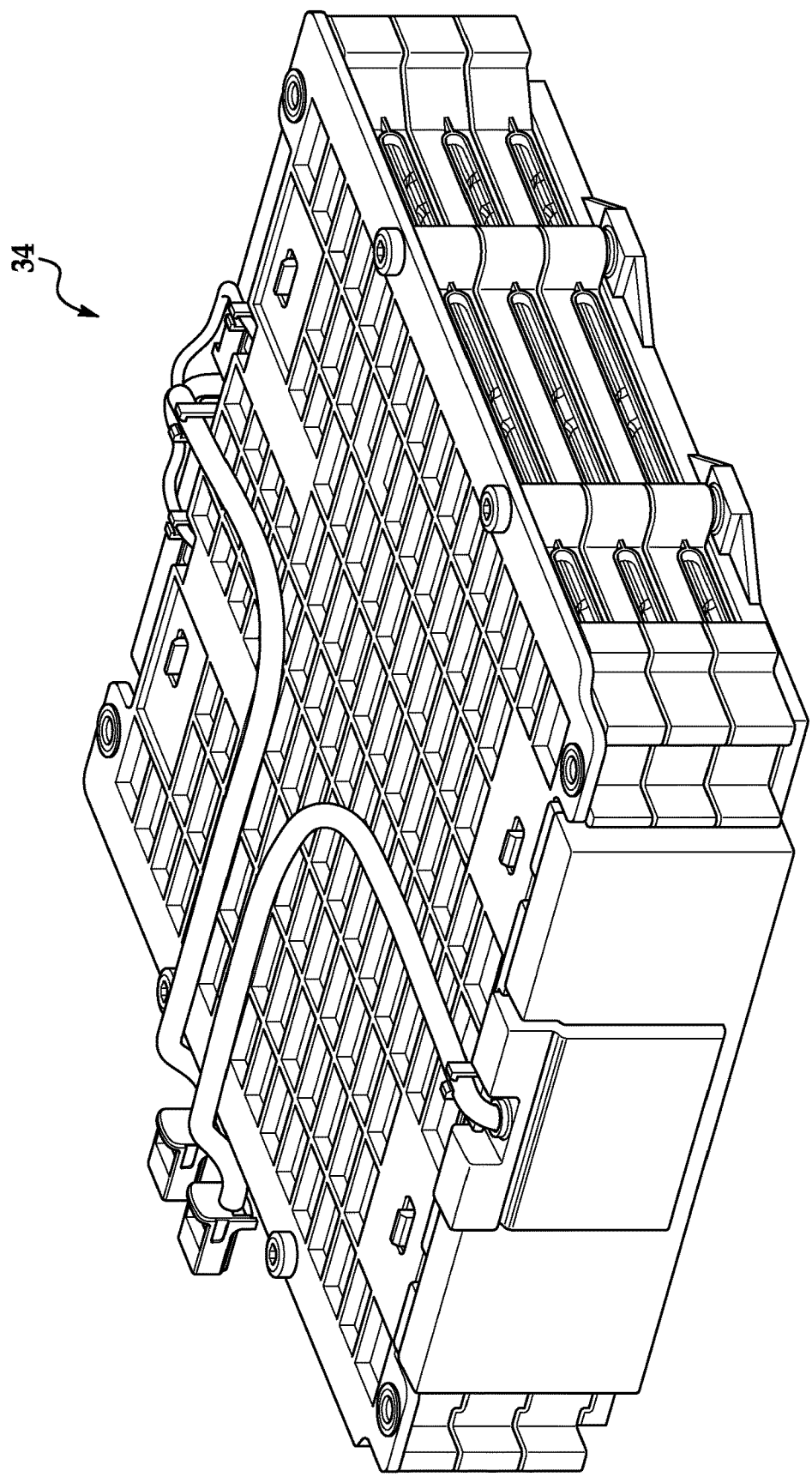
FIG. 8 is another schematic of the battery module of FIG. 7.
Figure 9:
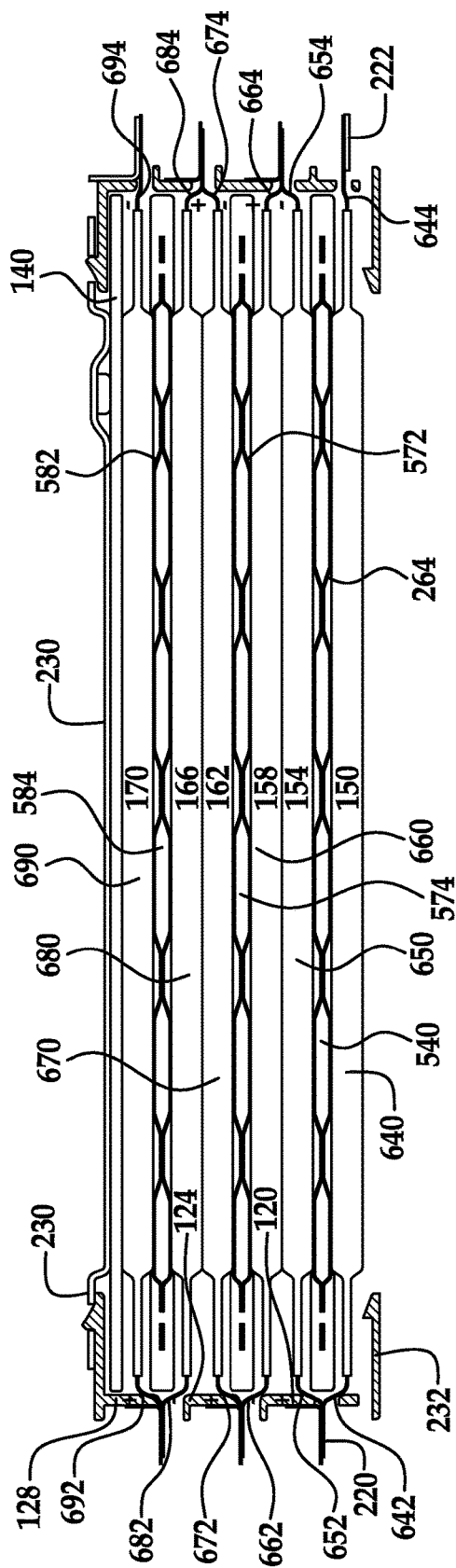
FIG. 9 is a cross-sectional schematic of the battery module of FIG. 7 taken along lines 9-9.
Figure 10:
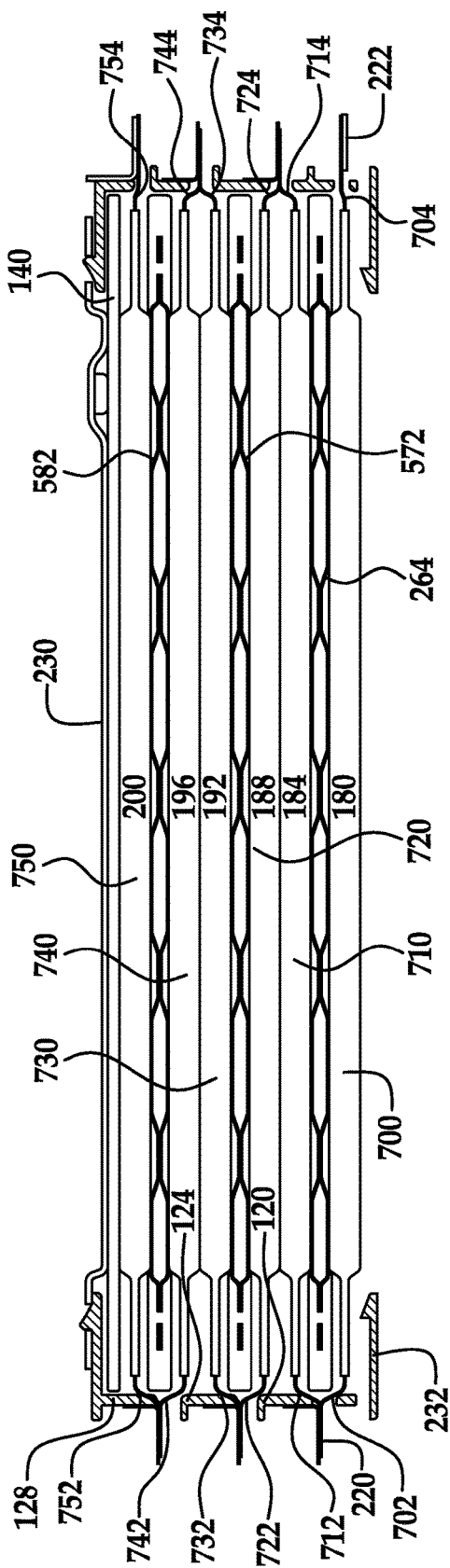
FIG. 10 is a cross-sectional schematic of the battery module of FIG. 7 taken along lines 10-10.
Figure 11:
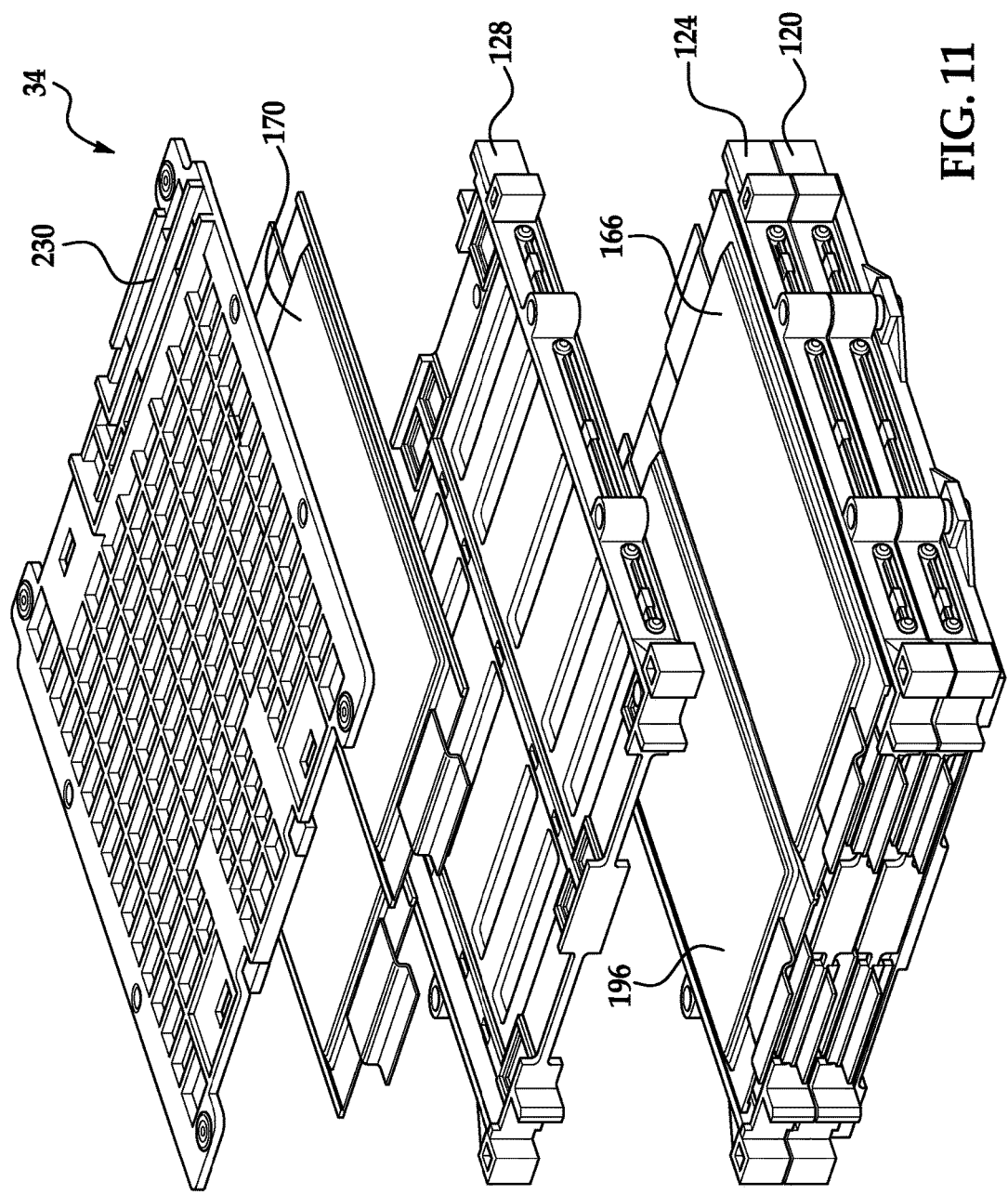
FIG. 11 is an exploded view of a portion of the battery module of FIG. 7.

Referring to FIGS. 7, 9, and 10, the frame members 120, 124, 128 are provided to hold the battery cells 150-200 therebetween. The frame member 124 is coupled to and between the frame members 120, 128. The structure of each of the frame members 120, 124, 128 are identical to one another. Accordingly, only the structure of the frame member 120 will be described in detail below.

Figure 15:
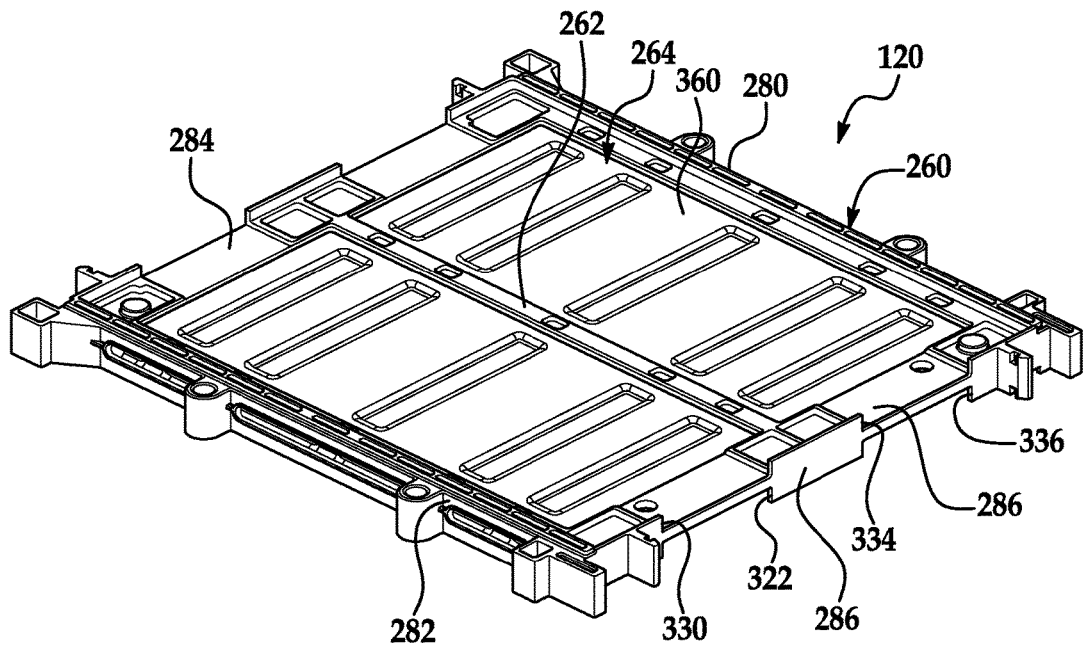
FIG. 15 is another schematic of the frame member of FIG. 14.
Figure 16:
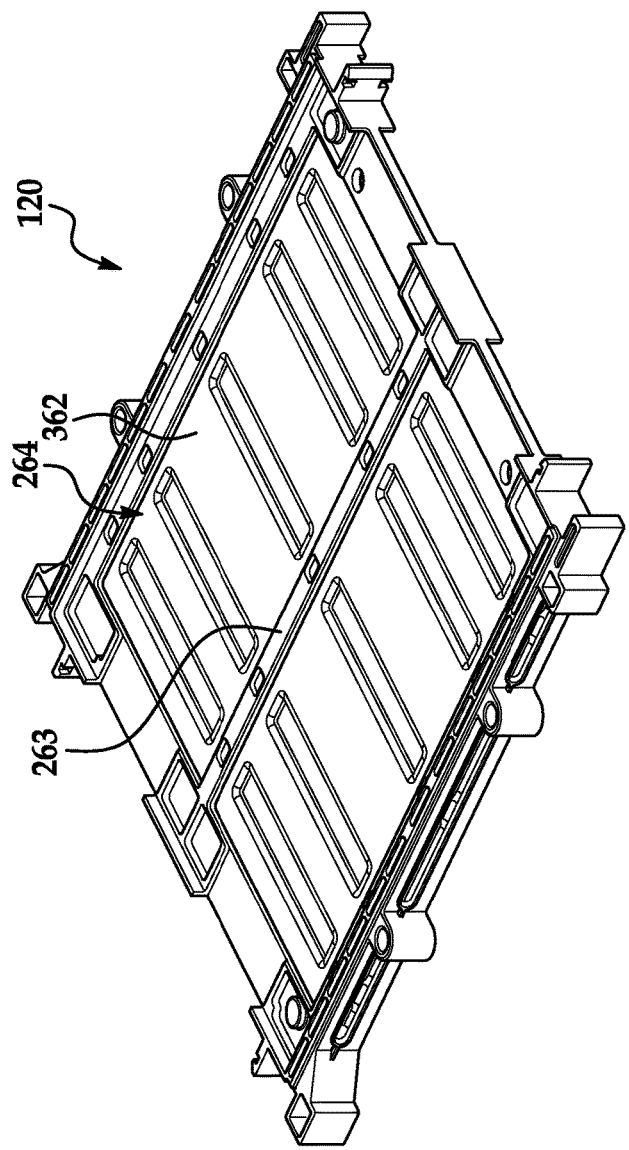
FIG. 16 is another schematic of the frame member of FIG. 15.
Figure 17:
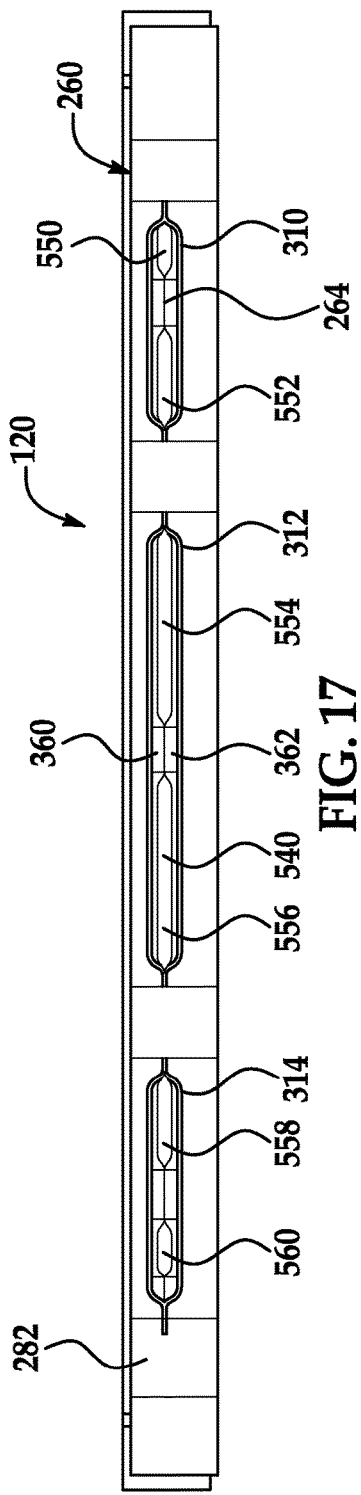
FIG. 17 is a side view of the frame member of FIG. 15 illustrating an end of a heat exchanger.
Figure 18:
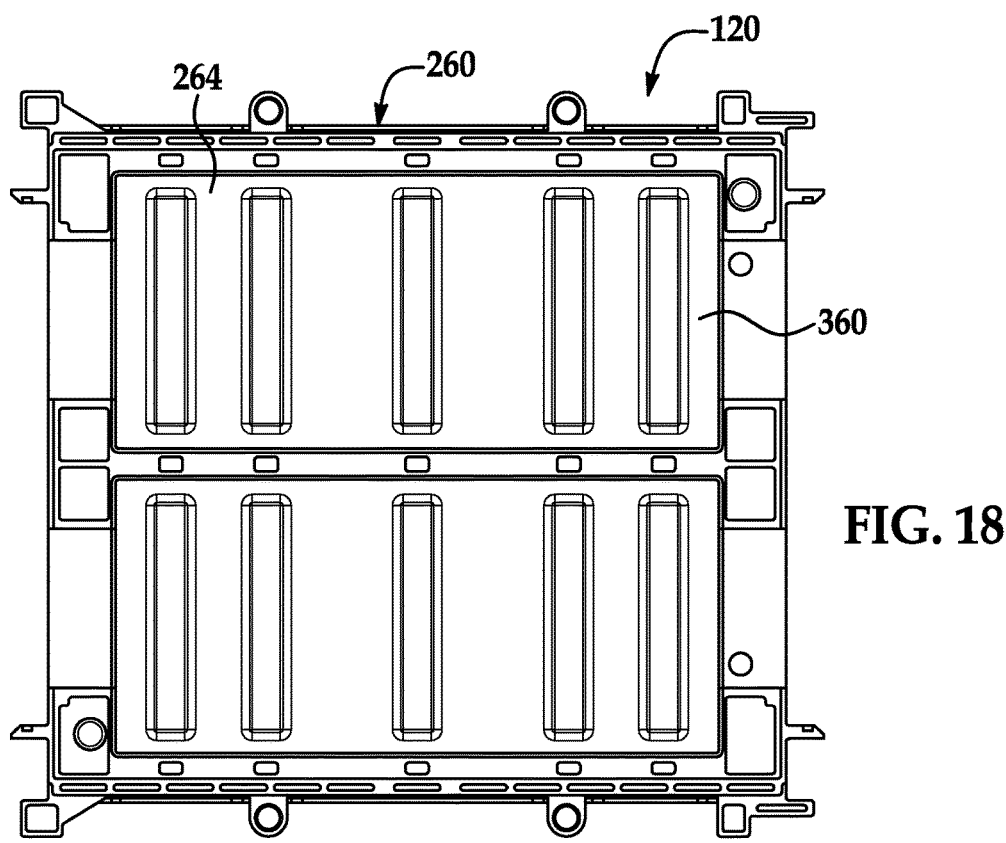
FIG. 18 is a schematic of a first side of the frame member of FIG. 15.
Figure 19:
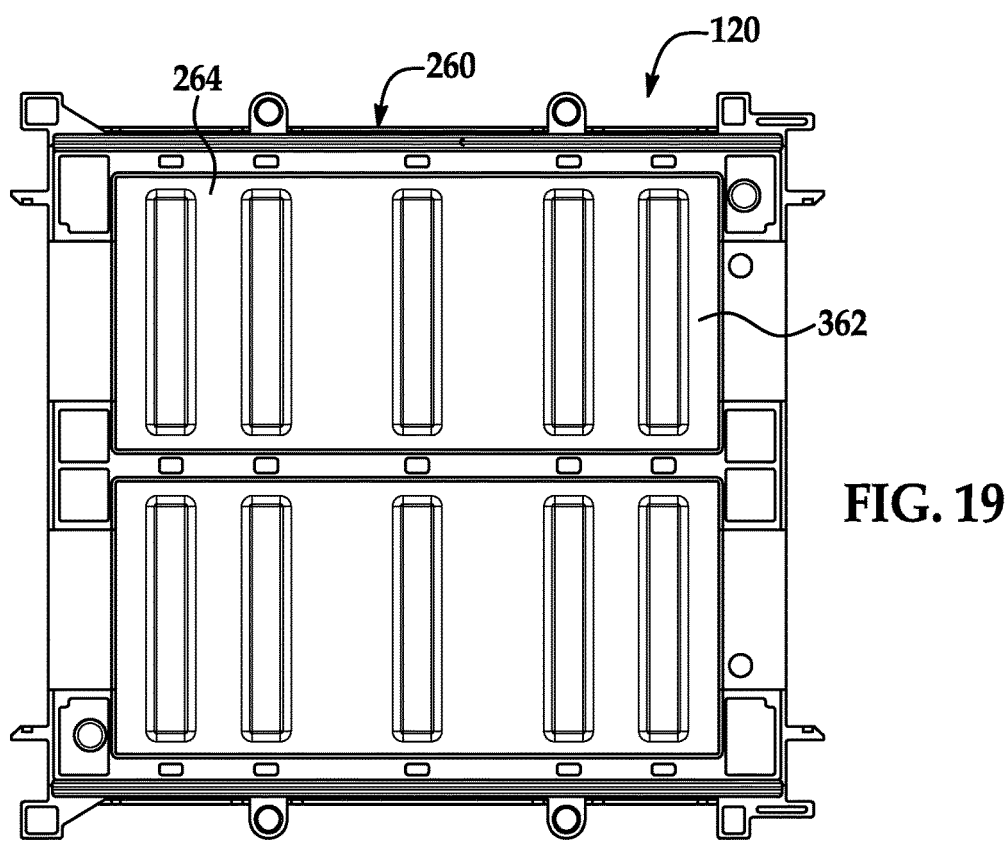
FIG. 19 is a schematic of a second side of the frame member of FIG. 15.

Referring to FIGS. 14-21, the frame member 120 has a substantially rectangular ring-shaped outer plastic frame 260, central plastic walls 262, 263, and a heat exchanger 264. The heat exchanger 264 has first and second thermally conductive plates 360, 362 that are coupled together and define a flow path portion 540 that extends therethrough. Referring to FIG. 17, the flow path portion 540 has flow path subportions 550, 552, 554, 556, 558, 560 each extending through the first and second thermally conductive plates 360, 362.

Figure 14:
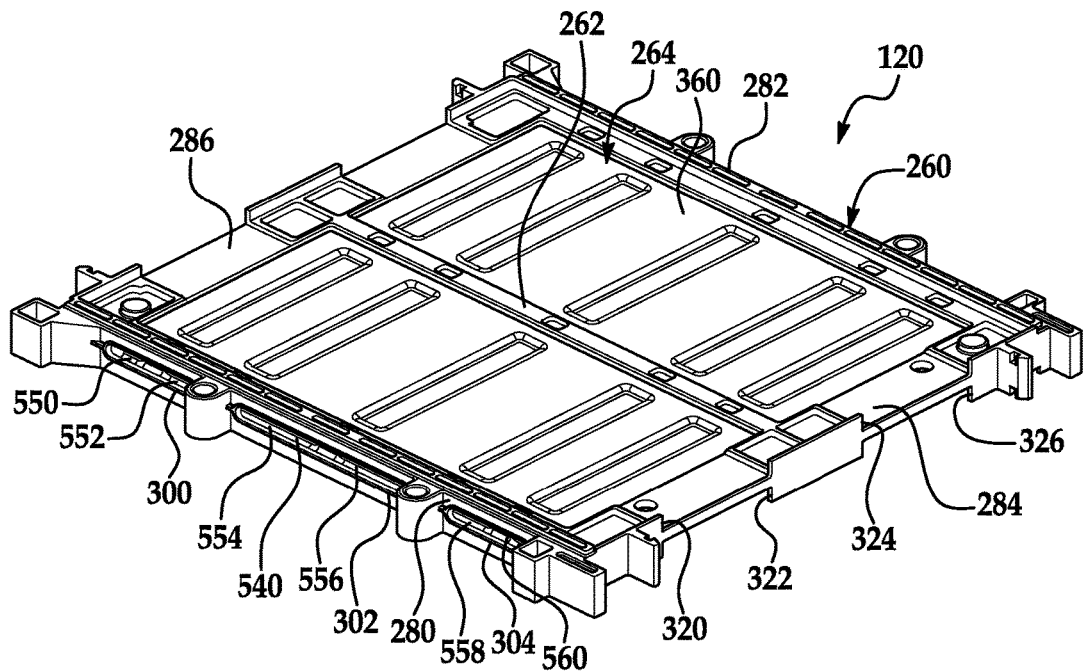
FIG. 14 is a schematic of a frame member utilized in the battery module of FIG. 7.

Referring to FIGS. 14-16, the substantially rectangular ring-shaped outer plastic frame 260 is coupled around an outer peripheral region of the first and second thermally conductive plates 360, 362. The first substantially rectangular ring-shaped outer plastic frame 360 has first, second, third, and fourth side walls 280, 282, 284, 286. The first and second side walls 280, 282 extend substantially parallel to one another. The third and fourth side walls 284, 286 are coupled between the first and second side walls 280, 282 and extend substantially parallel to one another and perpendicular to the first and second side walls 280, 282.

The central plastic wall 262 extends between the third and fourth side walls 284, 286 substantially parallel to the first and second side walls 280, 282. The central plastic wall 262 is disposed on a portion of the first side 380 (shown in FIG. 20) of the thermally conductive plate 360 of the heat exchanger 264.

The central plastic wall 263 extends between the third and fourth side walls 284, 286 substantially parallel to the first and second side walls 280, 282. The central plastic wall 263 is disposed on a portion of the first side 480 (shown in FIG. 22) of the thermally conductive plate 362 of the heat exchanger 264.

The first, third, and fourth side walls 280, 284, 286 and the central plastic wall 262 define a region for receiving a battery cell therein. The second, third, and fourth side walls 282, 284, 286 define a region for receiving another battery cell therein.

The first side wall 280 has apertures 300, 302, 304 extending therethrough. The aperture 300 fluidly communicates with the flow path subportions 550, 552. Also, the aperture 302 fluidly communicates with the flow path subportions 554, 556. Further, the aperture 304 fluidly communicates with the flow path subportions 558, 560.

Referring to FIG. 17, the second side wall 282 has apertures 310, 312, 314 extending therethrough. The aperture 310 fluidly communicates with the flow path subportions 550, 552. Also, the aperture 312 fluidly communicates with the flow path subportions 554, 556. Further, the aperture 314 fluidly communicates with the flow path subportions 558, 560.

Referring to FIGS. 14 and 15, the third side wall 284 has grooves 320, 322, 324, 326 extending therein. The fourth side wall 286 has grooves 330, 332, 334, 336 extending therein. The grooves 320, 330 are configured to receive first and second electrical terminals of a battery cell therethrough. Further, the grooves 324, 334 are configured to receive first and second electrical terminals of another battery cell therethrough. Still further, the grooves 322, 332 are configured to receive first and second electrical terminals of another battery cell therethrough. Finally, the grooves 326, 336 are configured to receive first and second electrical terminals of another battery cell therethrough.

Figure 20:
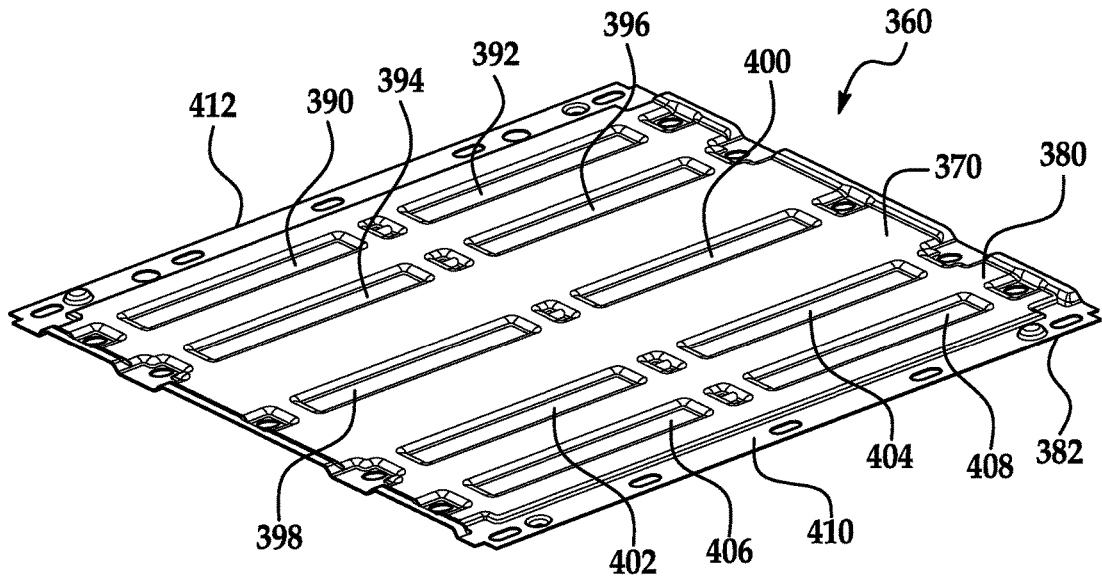
FIG. 20 is a schematic of a first side of a first thermally conductive plate utilized in a heat exchanger in the frame member of FIG. 15.
Figure 21:
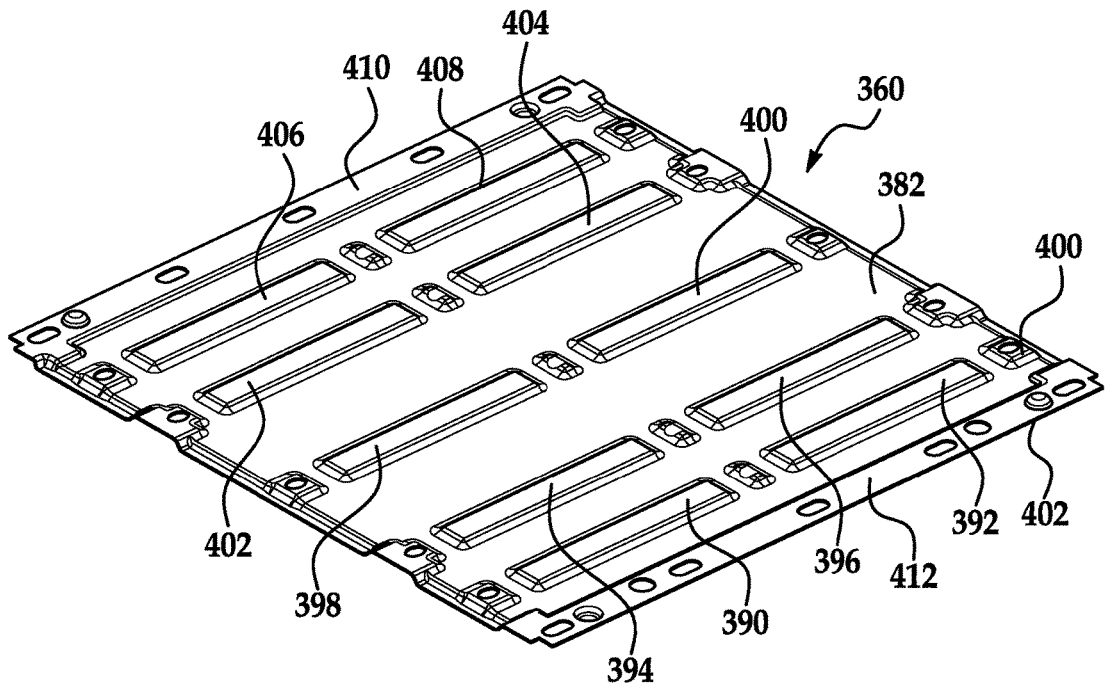
FIG. 21 is a schematic of a second side of the first thermally conductive plate of FIG. 20.
Figure 22:
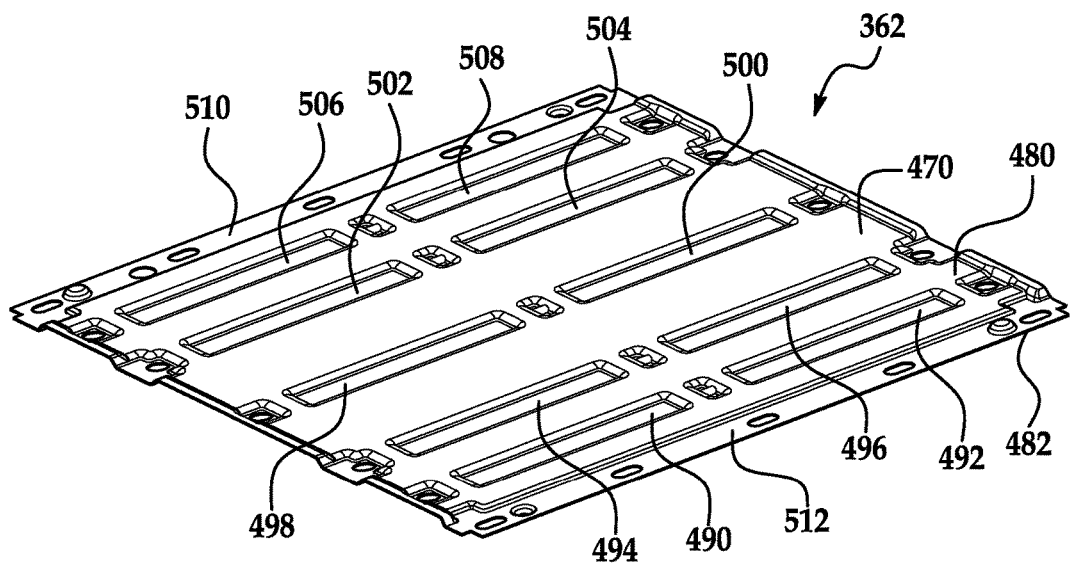
FIG. 22 is a schematic of a first side of a second thermally conductive plate utilized in a heat exchanger in the frame member of FIG. 15.

Referring to FIGS. 20-22, the heat exchanger 264 includes first and second thermally conductive plates 360, 362 that are coupled together and define the flow path portion 540 extending completely through the plates 360, 362.

The first thermally conductive plate 360 includes a sheet portion 370 having a first side 380 and a second side 382. The sheet portion 370 includes elongated depressed portions 390, 392, 394, 396, 398, 400, 402, 404, 406, 408, and depressed edge portions 410, 412. In an exemplary embodiment, the sheet portion 370 is constructed of aluminum and is substantially rectangular-shaped.

The second thermally conductive plate 362 includes a sheet portion 470 having a first side 480 and a second side 482. The sheet portion 470 includes elongated depressed portions 490, 492, 494, 496, 498, 500, 502, 504, 506, 508, and depressed edge portions 510, 512. In an exemplary embodiment, the sheet portion 470 is constructed of aluminum and is substantially rectangular-shaped.

The first thermally conductive plate 360 is coupled to the second thermally conductive plate 362 such that the elongated depressed portions 390, 392, 394, 396, 398, 400, 402, 404, 406, 408 contact and are coupled to the elongated depressed portions 490, 492, 494, 496, 498, 500, 502, 504, 506, 508, respectively and the depressed edge portions 410, 412 contact and are coupled to the depressed edge portions 510, 512. The plates 360, 362 define the flow path portion 540 having the flow path subportions 550, 552, 554, 556, 558, 560 that extending entirely through a longitudinal length of the plates 360, 362.

Referring to FIG. 7, the frame member 124 has an identical structure as the frame member 120 described above. The frame member 124 has a substantially rectangular ring-shaped outer plastic frame 570, first and second central plastic walls (not shown), and a heat exchanger 572.

The frame member 128 has an identical structure as the frame member 120 described above. The frame member 128 has a substantially rectangular ring-shaped outer plastic frame 580, first and second central plastic walls (not shown), and a heat exchanger 582.

Figure 6:
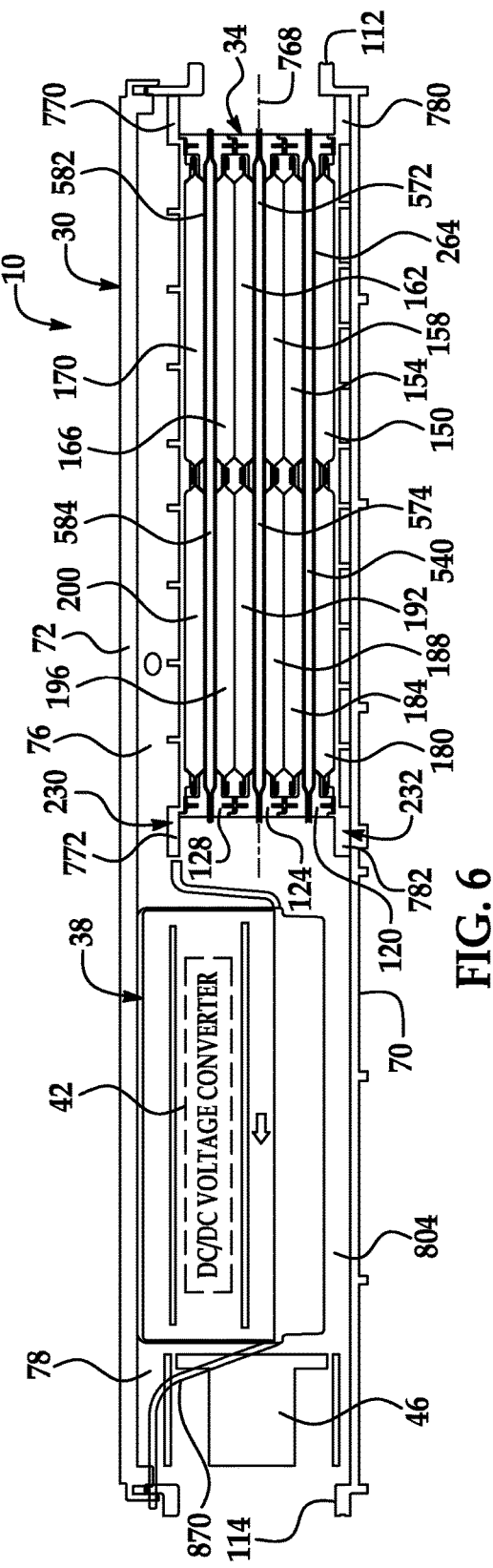
FIG. 6 is a cross-sectional schematic of the battery pack of FIG. 1.

Referring to FIGS. 6, 9 and 10, the frame member 120 and the end plate 232 are configured to hold the battery cells 150, 180 therebetween. Further, the heat exchanger 264 of the frame member 120 is disposed between and contacts the battery cells 150, 154. Also, the heat exchanger 264 is disposed between and contacts the battery cells 180, 184.

The frame members 120, 124 are configured to hold the battery cells 154, 158 therebetween. Further, the frame members 120, 124 are configured to hold the battery cells 184, 188 therebetween. The heat exchanger 572 of the frame member 124 is disposed between and contacts the battery cells 158, 162. Also, the heat exchanger 572 is disposed between and contacts the battery cells 188, 192.

The frame members 124, 128 are configured to hold the battery cells 162, 166 therebetween. Further, the frame members 124, 128 are configured to hold the battery cells 192, 196 therebetween. The heat exchanger 582 of the frame member 128 is disposed between and contacts the battery cells 166, 170. Also, the heat exchanger 582 is disposed between and contacts the battery cells 196, 200.

The frame member 128 and the insulating layer 140 (shown in FIG. 9) are configured to hold the battery cells 170, 200 therebetween. The heat exchanger 582 of the frame member 128 is disposed against the battery cells 170, 200. The end plate 230 is coupled to the frame member 128 such that the insulating layer 140 is disposed between the frame member 128 and the battery cells 170, 200.

The battery cells 150, 154, 158, 162, 166, 170, 180, 184, 188, 192, 196, 200 are each configured to generate an operational voltage. In one exemplary embodiment, the battery cells 150-200 are pouch-type lithium-ion battery cells that have a substantially rectangular-shaped body portion and a pair of electrical terminals. In an exemplary embodiment, the battery cells 150-200 are electrically coupled in series with one another utilizing interconnect members on the battery cell interconnect and voltage sensing assemblies 220, 222. Further, in an exemplary embodiment, the electrical terminals of the battery cells 150-200 are coupled to corresponding interconnect members by ultrasonically welding the electrical terminals of the battery cells 150-200 to the corresponding interconnect members utilizing an ultrasonic welding machine. The structure of the battery cells 150-200 are identical to one another.

Referring to FIG. 9, the battery cell 150 has a rectangular-shaped housing 640 with electrical terminals 642, 644, extending from first and second ends, respectively, of the housing 640. The electrical terminal 642 is electrically and physically coupled to the battery cell interconnect and voltage sensing assembly 220. The electrical terminal 644 is electrically and physically coupled to the battery cell interconnect and voltage sensing assembly 222.

The battery cell 154 has a rectangular-shaped housing 650 with electrical terminals 652, 654, extending from first and second ends, respectively, of the housing 650. The electrical terminal 652 is electrically and physically coupled to the battery cell interconnect and voltage sensing assembly 220. The electrical terminal 654 is electrically and physically coupled to the battery cell interconnect and voltage sensing assembly 222.

The battery cell 158 has a rectangular-shaped housing 660 with electrical terminals 662, 664, extending from first and second ends, respectively, of the housing 660. The electrical terminal 662 is electrically and physically coupled to the battery cell interconnect and voltage sensing assembly 220. The electrical terminal 664 is electrically and physically coupled to the battery cell interconnect and voltage sensing assembly 222.

The battery cell 162 has a rectangular-shaped housing 670 with electrical terminals 672, 674, extending from first and second ends, respectively, of the housing 670. The electrical terminal 672 is electrically and physically coupled to the battery cell interconnect and voltage sensing assembly 220. The electrical terminal 674 is electrically and physically coupled to the battery cell interconnect and voltage sensing assembly 222.

The battery cell 166 has a rectangular-shaped housing 680 with electrical terminals 682, 684, extending from first and second ends, respectively, of the housing 680. The electrical terminal 682 is electrically and physically coupled to the battery cell interconnect and voltage sensing assembly 220. The electrical terminal 684 is electrically and physically coupled to the battery cell interconnect and voltage sensing assembly 222.

The battery cell 170 has a rectangular-shaped housing 690 with electrical terminals 692, 694, extending from first and second ends, respectively, of the housing 690. The electrical terminal 692 is electrically and physically coupled to the battery cell interconnect and voltage sensing assembly 220.

The electrical terminal 694 is electrically and physically coupled to the battery cell interconnect and voltage sensing assembly 222.

The series combination of the battery cells 150-170 are electrically coupled in series with the series combination of the battery cells 180-200 utilizing an elongated interconnect member.

Referring to FIG. 10, the battery cell 180 has a rectangular-shaped housing 700 with electrical terminals 702, 704 extending from first and second ends, respectively, of the housing 700. The electrical terminal 702 is electrically and physically coupled to the battery cell interconnect and voltage sensing assembly 220. The electrical terminal 704 is electrically and physically coupled to the battery cell interconnect and voltage sensing assembly 222.

The battery cell 184 has a rectangular-shaped housing 710 with electrical terminals 712, 714 extending from first and second ends, respectively, of the housing 710. The electrical terminal 712 is electrically and physically coupled to the battery cell interconnect and voltage sensing assembly 220. The electrical terminal 714 is electrically and physically coupled to the battery cell interconnect and voltage sensing assembly 222.

The battery cell 188 has a rectangular-shaped housing 720 with electrical terminals 722, 724 extending from first and second ends, respectively, of the housing 720. The electrical terminal 722 is electrically and physically coupled to the battery cell interconnect and voltage sensing assembly 220. The electrical terminal 724 is electrically and physically coupled to the battery cell interconnect and voltage sensing assembly 222.

The battery cell 192 has a rectangular-shaped housing 730 with electrical terminals 732, 734 extending from first and second ends, respectively, of the housing 730. The electrical terminal 732 is electrically and physically coupled to the battery cell interconnect and voltage sensing assembly 220. The electrical terminal 734 is electrically and physically coupled to the battery cell interconnect and voltage sensing assembly 222.

The battery cell 196 has a rectangular-shaped housing 740 with electrical terminals 742, 744 extending from first and second ends, respectively, of the housing 740. The electrical terminal 742 is electrically and physically coupled to the battery cell interconnect and voltage sensing assembly 220. The electrical terminal 744 is electrically and physically coupled to the battery cell interconnect and voltage sensing assembly 222.

The battery cell 200 has a rectangular-shaped housing 750 with electrical terminals 752, 754 extending from first and second ends, respectively, of the housing 750. The electrical terminal 752 is electrically and physically coupled to the battery cell interconnect and voltage sensing assembly 220. The electrical terminal 754 is electrically and physically coupled to the battery cell interconnect and voltage sensing assembly 222.

Referring to FIG. 6, the end plates 230, 232 are provided to guide cooling air through the flow path portions 540, 574, 584 of the frame members 120, 124, 128, respectively. The end plates 230, 232 have the frame members 120-128 and the battery cells 150-200 disposed therebetween.

The end plate 230 extends substantially parallel to a longitudinal axis 768 of the battery module 34. The end plate 230 has a first end portion 770 and a second end portion 772. The first end portion 770 extends longitudinally past a first end of each of the battery cells 150-170 toward the inlet aperture 112. The second end portion 772 extends longitudinally past the second end of each of the battery cells 180-200.

The end plate 232 extends substantially parallel to the longitudinal axis 768 of the battery module 34. The end plate 232 has a first end portion 780 and a second end portion 782. The first end portion 780 extends longitudinally past a first end of each of the battery cells 150-170 toward the inlet aperture 112. The second end portion 782 extends longitudinally past the second end of each of the battery cells 180-200.

Referring to FIGS. 5, 6 and 23-26, the thermally conductive housing 38 is provided to hold the DC/DC voltage converter 42 therein that is electrically coupled to the battery cells of the battery module 34. The thermally conductive housing 38 transfers heat from the DC/DC voltage converter 42 to air flowing past the thermally conductive housing. The thermally conductive housing 38 is disposed in the interior space 78 of the interior region 74 of the battery pack housing 30 between the battery module 34 and the outlet aperture 114 of the battery pack housing 30. The thermally conductive housing 38 defines a flow path portion 804 between the thermally conductive housing 38 and the battery pack housing 30. The flow path portion 804 fluidly communicates with the flow path portions 540, 574, 584 of the battery module 34 and with the outlet aperture 114.

The thermally conductive housing 38 includes a housing portion 800 and a frame member 802. The housing portion 800 includes bottom wall 810 and cooling fins 820, 822, 824, 826, 840, 842, 844, 846, 848 extending outwardly from the bottom wall 810 in a first direction. The cooling fins 820-848 are spaced apart from one another such that the flow path portion 804 is defined between the cooling fins 820-848. The cooling fins 820-848 are disposed on the bottom wall 90 (shown in FIG. 5) of the base portion 70. In an exemplary embodiment, the thermally conductive housing 38 is constructed of aluminum. Of course, in an alternative embodiment, the thermally conductive housing 38 can be constructed of other materials such as steel or other metal alloys for example.

Figure 23:
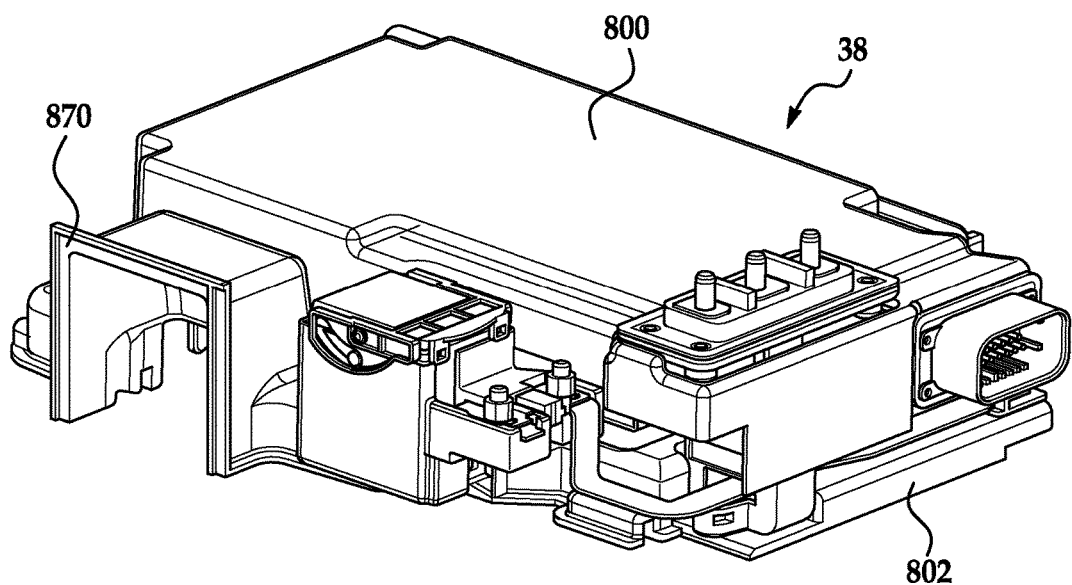
FIG. 23 is a schematic of a thermally conductive housing utilized in the battery pack of FIG. 1.
Figure 24:
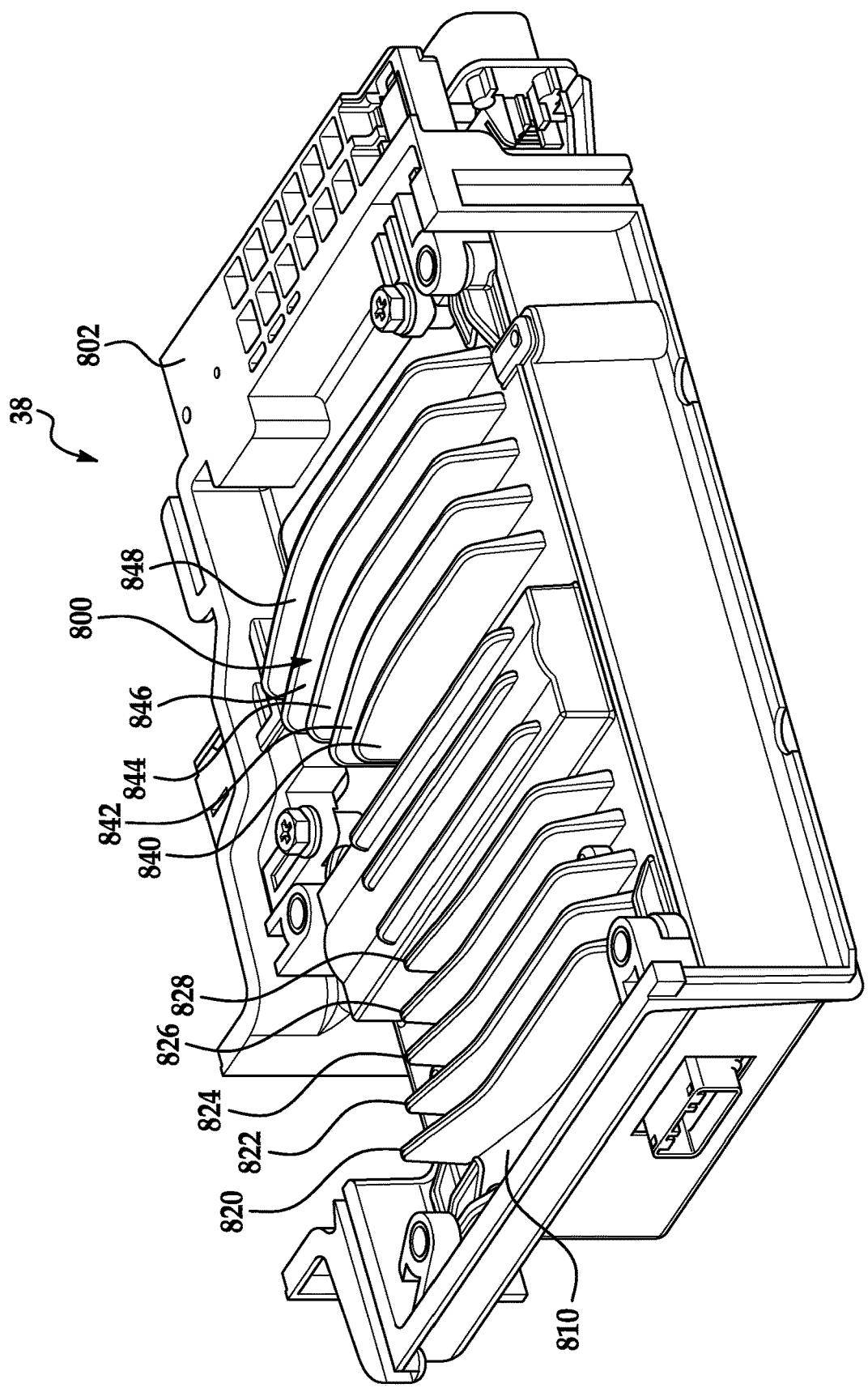
FIG. 24 is another schematic of the thermally conductive housing of FIG. 23.
Figure 25:
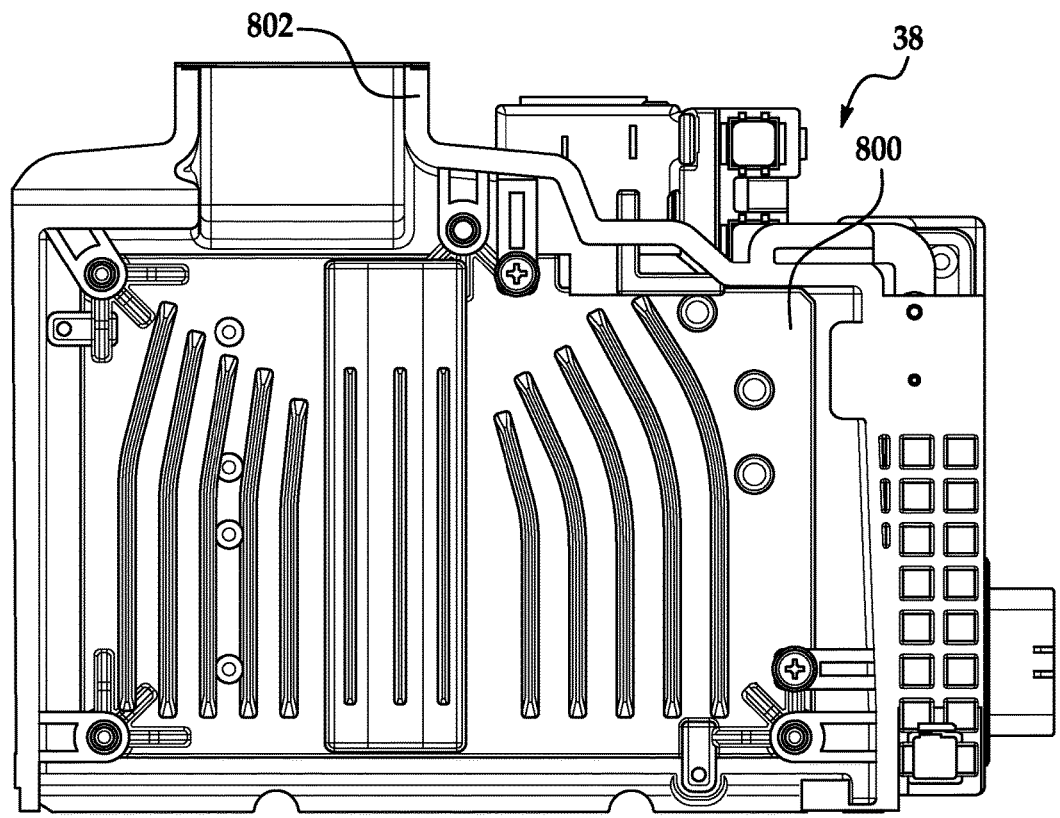
FIG. 25 is a schematic of a bottom side of the thermally conductive housing of FIG. 23.
Figure 26:
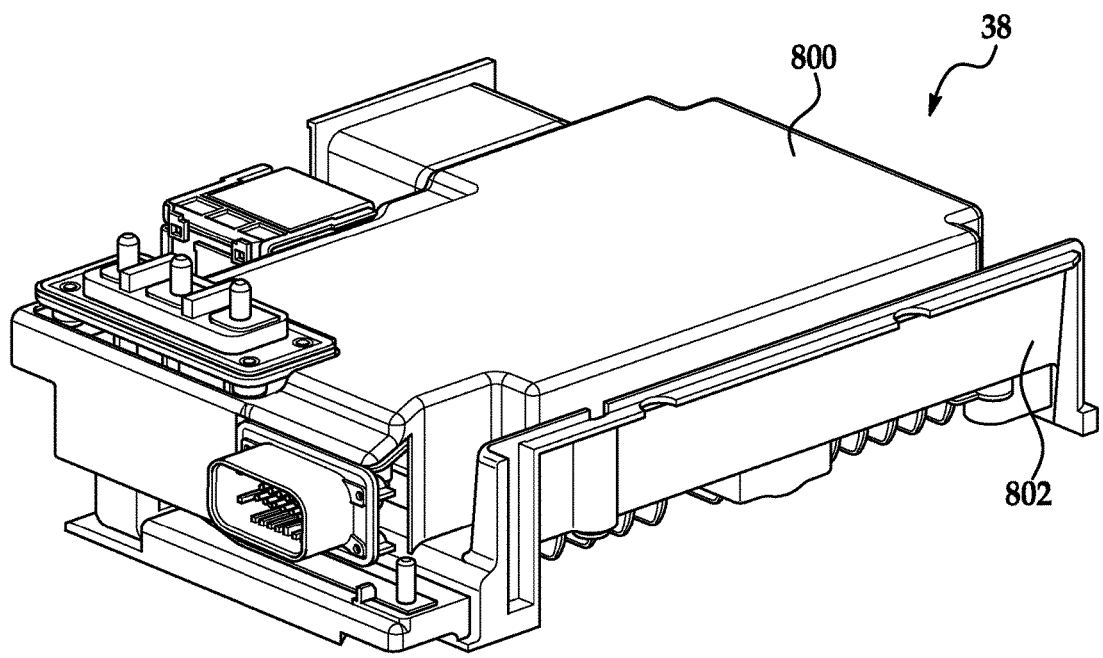
FIG. 26 is another schematic of the thermally conductive housing of FIG. 23.
Figure 27:
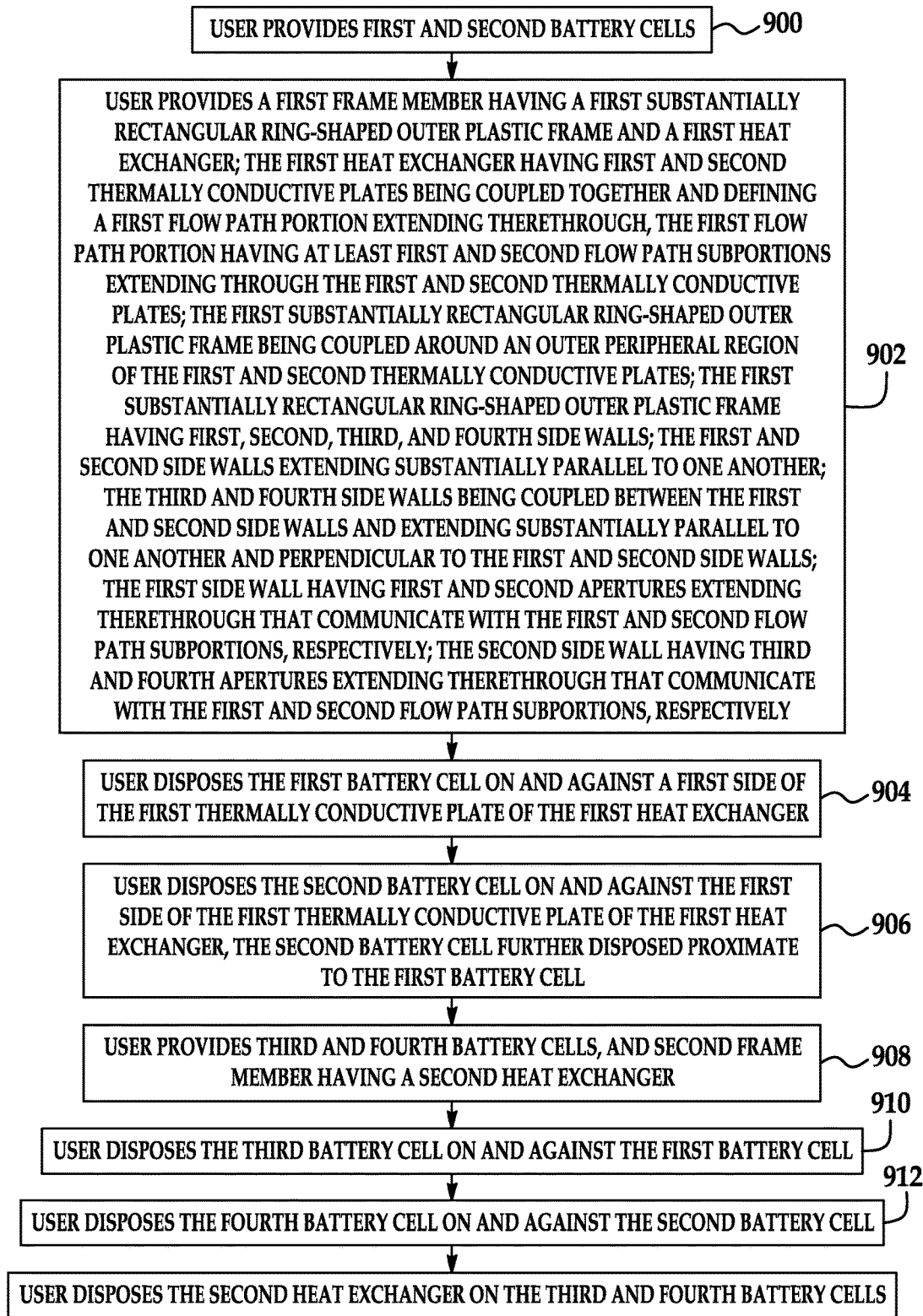
FIG. 27 is a flowchart of a method of assembling a battery module in accordance with another exemplary embodiment.

Referring to FIGS. 6 and 23, the frame member 802 is coupled to an exterior of the thermally conductive housing 38 and includes an outlet portion 870 that directs air toward the fan 46 and the outlet aperture 114 of the battery pack housing 30.

Referring to FIGS. 5 and 6, the electric fan 46 is disposed in the interior region 74 of the battery pack housing 30 proximate to the outlet aperture 114 of the battery pack housing 30. The electric fan 46 is adapted to urge air to flow through the inlet aperture 112 and through the flow path portions 540, 574, 584 of the battery module and the flow path portion 804 and further through a portion of the electric fan 46 and through the outlet aperture 114 of the battery pack housing 30. In an alternative embodiment, the electric fan 46 is disposed proximate to the inlet aperture 112.

Referring to FIGS. 6, 14, 16, 17 and 27, a flowchart of a method of assembling a portion of the battery module 34 in accordance with another exemplary embodiment is provided.

At step 900, a user provides the battery cells 154, 184. After step 900, the method advances to step 902.

At step 902, the user provides the frame member 120 having the substantially rectangular ring-shaped outer plastic frame 260 and the heat exchanger 264. The heat exchanger 264 has first and second thermally conductive plates 360, 362 that are coupled together and define a flow path portion 540 (shown in FIG. 17) extending therethrough.

The flow path portion 540 has at least flow path subportions 554, 558 extending through the first and second thermally conductive plates 360, 362. The substantially rectangular ring-shaped outer plastic frame 260 is coupled around an outer peripheral region of the first and second thermally conductive plates 360, 362. The substantially rectangular ring-shaped outer plastic frame 260 has first, second, third, and fourth side walls 280, 282, 284, 286. The first and second side walls 280, 282 extend substantially parallel to one another. The third and fourth side walls 284, 286 are coupled between the first and second side walls 280, 282 and extend substantially parallel to one another and perpendicular to the first and second side walls 280, 282. The first side wall 280 has apertures 302, 304 (shown in FIG. 14) extending therethrough that communicate with the flow path subportions 554, 558, respectively. The second side wall 282 has apertures 312, 314 (shown in FIG. 17) extending therethrough that communicate with the flow path subportions 554, 558, respectively. After step 902, the method advances to step 904.

At step 904, the user disposes the battery cell 154 on and against a first side of the first thermally conductive plate 360 of the heat exchanger 264. After step 904, the method advances to step 906.

At step 906, the user disposes the battery cell 184 on and against the first side of the first thermally conductive plate 360 of the heat exchanger 264. The battery cell 184 is further disposed proximate to the battery cell 154. After step 906, the method advances to step 908.

At step 908, the user provides battery cells 158, 188 and the frame member 124 having the heat exchanger 572. After step 908, the method advances to step 910.

At step 910, the user disposes the battery cell 158 on and against the battery cell 154. After step 910, the method advances to step 912.

At step 912, the user disposes the battery cell 188 on and against the battery cell 184. After step 912, the method advances to step 914.

At step 914, the user disposes the heat exchanger 572 on the battery cells 158, 188.

Referring to FIGS. 2, 6 and 28, a flowchart of a method of assembling the battery pack 10 in accordance with another exemplary embodiment is provided.

At step 930, the user provides the battery pack housing 30, the battery module 34, the thermally conductive housing 38, and the electric fan 46. The battery pack housing 30 defines the interior region 74. The battery pack housing 30 further includes the inlet aperture 112 and the outlet aperture 114 communicating with the interior region 74. The battery module 34 has the battery cell 154, the heat exchanger 264, and end plates 230, 232. The battery cell 154 and the heat exchanger 264 are disposed against one another, and are further disposed between the end plates 230, 232. The heat exchanger 264 defines a flow path portion 540 therethrough. The battery cell 154 has a first end and a second end. The end plate 230 extends substantially parallel to the longitudinal axis 768 of the battery module 34. The end plate 230 has the first end portion 770 and the second end portion 772. The first end portion 770 of the end plate 230 extends longitudinally past the first end of the battery cell 154. The second end portion 772 of the end plate 230 extends longitudinally past the second end of the battery cell 154. The end plate 232 extends substantially parallel to the longitudinal axis 768 of the battery module 34. The end plate 232 having the first end portion 780 and the second end portion 782. The first end portion 780 of the end plate 232 extends longitudinally past the first end of the battery cell 154. The second end portion 782 of the end plate 232 extends longitudinally past the second end of the battery cell 154. After step 930, the method advances to step 932.

At step 932, the user disposes the battery module 34 in the interior region 74 of the battery pack housing 30 proximate to the inlet aperture 112. After step 932, the method advances to step 934.

At step 934, the user disposes the thermally conductive housing 38 in the interior region 74 of the battery pack housing 30 between the battery module 34 and the outlet aperture 114 of the battery pack housing 30. The thermally conductive housing 38 defines the path portion 804 between the thermally conductive housing 38 and the battery pack housing 30. The flow path portion 804 fluidly communicates with the flow path portion 540. After step 934, the method advances to step 936.

At step 936, the user disposes the electric fan 46 in the interior region 74 of the battery pack housing 30 proximate to the outlet aperture 114 of the battery pack housing 30. The electric fan 46 is adapted to urge air to flow through the inlet aperture 112 and through the path portions 540, 804 and further through a portion of the electric fan 46 and through the outlet aperture 114 of the battery pack housing 30.

The battery pack and the method of assembling the battery pack provide a substantial advantage over other battery packs and methods. In particular, the battery pack and the method utilize a battery module with first and second end plates that extend past ends of a battery cell to direct air into a heat exchanger disposed against the battery cell to cool the battery module.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A battery pack, comprising:
   a battery pack housing having a base portion and an upper cover; the base portion and the upper cover defining an interior region when the upper cover is coupled to the base portion, the base portion having a bottom wall and first and second side walls coupled to the bottom wall, the first side wall having an inlet aperture extending therethrough that communicates with the interior region, the second side wall having an outlet aperture extending therethrough that communicates with the interior region;
   a battery module being disposed in the interior region of the battery pack housing proximate to the inlet aperture, the battery module having a first battery cell, a first frame member, and first and second end plates;
   the first frame member having a first rectangular ring-shaped outer plastic frame and a first aluminum heat exchanger, the first rectangular ring-shaped outer plastic frame being coupled around an outer peripheral region of first and second thermally conductive plates of the first aluminum heat exchanger, the first rectangular ring-shaped outer plastic frame having first, second, third, and fourth walls; the first and second walls extending parallel to one another; the third and fourth walls extending parallel to one another and perpendicular to the first and second walls; the first wall having first, second, and third apertures extending therethrough with the second aperture thereof being disposed between the first and third apertures thereof; the second wall having first, second, and third apertures extending therethrough with the second aperture thereof being disposed between the first and third apertures thereof; the first and second thermally conductive aluminum plates being coupled together and directly contacting one another such that the first and second thermally conductive aluminum plates define a first flow path portion therebetween, the first flow path portion fluidly communicating with the first, second, and third apertures of the first wall of the first rectangular ring-shaped outer plastic frame and with the first, second, and third apertures of the second wall of the rectangular ring-shaped outer plastic frame; the first battery cell and the first aluminum heat exchanger being disposed against one another, and being further disposed between the first and second end plates; the first battery cell having a first end and a second end;

the first end plate extending substantially parallel to a longitudinal axis of the battery module, the first end plate having a first end portion and a second end portion, the first end portion of the first end plate extending longitudinally past the first end of the first battery cell toward the inlet aperture, the first end portion of the first end plate contacting the first side wall of the base portion above the inlet aperture and a first distance below a top end of the first side wall; the second end portion of the first end plate extending longitudinally past the second end of the first battery cell;

the second end plate extending substantially parallel to the longitudinal axis of the battery module, the second end plate having a first end portion and a second end portion, the first end portion of the second end plate extending longitudinally past the first end of the first battery cell toward the inlet aperture; the second end portion of the second end plate extending longitudinally past the second end of the first battery cell, the first end portion of the second end plate contacting the first side wall of the base portion below the inlet aperture and a second distance above a bottom end of the first side wall; the second end plate being disposed away from the first end plate, and the first end portion of the first end plate and the first end portion of the second end plate forming a channel for routing air from the inlet aperture into the first, second, and third apertures in the first wall of the first rectangular ring-shaped outer plastic frame, and into the first flow path portion of the first aluminum heat exchanger;

a thermally conductive housing being disposed in the interior region of the battery pack housing between the battery module and the outlet aperture of the battery pack housing; the thermally conductive housing defining a second flow path portion between the thermally conductive housing and the battery pack housing, the second flow path portion communicating with the first flow path portion; and an electric fan disposed in the interior region of the battery pack housing; the electric fan adapted to urge the air to flow through the inlet aperture of the battery pack housing and through the first and second flow path portions and further through a portion of the electric fan and through the outlet aperture of the battery pack housing.

2. The battery pack of claim 1, wherein the thermally conductive housing having a bottom wall and a plurality of cooling fins extending outwardly from the bottom wall thereof and spaced apart from one another such that the second flow path portion is at least partially defined between the plurality of cooling fins.

3. The battery pack of claim 2, wherein the thermally conductive housing holds a DC/DC voltage converter that is electrically coupled to the first battery cell of the battery module.

4. The battery pack of claim 3, wherein the battery module being disposed on the bottom wall of the base portion, and the plurality of cooling fins of the thermally conductive housing being disposed on the bottom wall of the base portion.

5. The battery pack of claim 2, wherein the thermally conductive housing is constructed of aluminum.

6. The battery pack of claim 1, wherein the first battery cell is disposed against a first side of the first aluminum heat exchanger, the battery module further having a second battery cell disposed against the first side of the first aluminum heat exchanger.

7. The battery pack of claim 1, wherein the first flow path portion having at least first and second flow path subportions extending through the first and second thermally conductive plates.

8. The battery pack of claim 7, wherein the first battery cell being disposed against a first side of the first thermally conductive plate of the first aluminum heat exchanger, the battery pack further comprising a second battery cell being disposed against the first side of the first thermally conductive plate of the first aluminum heat exchanger.

9. The battery pack of claim 1, wherein the electric fan is further disposed proximate to the outlet aperture of the battery pack housing.

10. The battery pack of claim 1, wherein the base portion further includes third and fourth side walls; the first, second, third and fourth side walls are coupled to the bottom wall and extend upwardly substantially perpendicular to the bottom wall, the first and second side walls extend substantially parallel to one another, the third and fourth side walls extend substantially parallel to one another and perpendicular to the first and second side walls.

11. The battery pack of claim 1, wherein the battery module further includes a second battery cell and a second frame member, the second frame member having a second aluminum heat exchanger; the second battery cell being disposed against and between the second aluminum heat exchanger and the first battery cell; the second battery cell and a second aluminum heat exchanger being further disposed between the first and second end plates; the second aluminum heat exchanger defining a third flow path portion therethrough that extends substantially parallel to the first flow path portion.

12. The battery pack of claim 11, wherein the first and third flow path portions of the first and second aluminum heat exchangers, respectively, extend substantially parallel to the longitudinal axis of the battery module, such that the air flows substantially longitudinally through the first and second aluminum heat exchangers.

13. The battery pack of claim 11, wherein the first battery cell is a pouch-type lithium-ion battery cell having a substantially rectangular-shaped body that is disposed on and against the first aluminum heat exchanger, the second battery cell is a pouch-type lithium-ion battery cell having a substantially rectangular-shaped body that is disposed on and against the second aluminum heat exchanger.

14. A battery pack, comprising:

a battery pack housing having a base portion and an upper cover; the base portion and the upper cover defining an interior region when the upper cover is coupled to the base portion, the base portion having a bottom wall and first and second side walls coupled to the bottom wall, the first side wall having an inlet aperture extending therethrough that communicates with the interior region, the second side wall having an outlet aperture extending therethrough that communicates with the interior region;

a battery module being disposed in the interior region of the battery pack housing proximate to the inlet aperture, the battery module having a first battery cell, a second battery cell, first and second frame members, and first and second end plates;

the first frame member having a first rectangular ring-shaped outer plastic frame and a first aluminum heat exchanger, the first rectangular ring-shaped outer plastic frame being coupled around an outer peripheral region of first and second thermally conductive plates of the first aluminum heat exchanger; the first rectangular ring-shaped outer plastic frame having first, second, and third apertures extending through a first wall thereof with the second aperture being disposed between the first and third apertures; the first rectangular ring-shaped outer plastic frame having fourth, fifth, and sixth apertures extending through a second wall thereof with the fifth aperture being disposed between the fourth and sixth apertures; the first and second thermally conductive aluminum plates being coupled together and directly contacting one another such that the first and second thermally conductive aluminum plates define a first flow path portion therebetween;

the second frame member having a second rectangular ring-shaped outer plastic frame and a second aluminum heat exchanger, the second aluminum heat exchanger having first and second thermally conductive aluminum plates coupled together that define a second flow path portion therebetween; the first battery cell and the first aluminum heat exchanger being disposed against one another, and being further disposed between the first and second end plates; the first battery cell having a first end and a second end; the second battery cell being disposed against and between the second aluminum heat exchanger and the first battery cell; the second battery cell and a second aluminum heat exchanger being further disposed between the first and second end plates; the second battery cell having a first end and a second end;

the first end plate extending substantially parallel to a longitudinal axis of the battery module, the first end plate having a first end portion and a second end portion, the first end portion of the first end plate extending longitudinally past both the first end of the first battery cell and the first end of the second battery cell toward the inlet aperture, the first end portion of the first end plate contacting the first side wall of the base portion above the inlet aperture and a first distance below a top end of the first side wall; the second end portion of the first end plate extending longitudinally past both the second end of the first battery cell and the second end of the second battery cell;

the second end plate extending substantially parallel to the longitudinal axis of the battery module, the second end plate having a first end portion and a second end portion, the first end portion of the second end plate extending longitudinally past the first end of the first battery cell and the first end of the second battery cell toward the inlet aperture; the second end portion of the second end plate extending longitudinally past the second end of the first battery cell and the second end of the second battery cell, the first end portion of the second end plate contacting the first side wall of the base portion below the inlet aperture and a second distance above a bottom end of the first side wall; the second end plate being disposed away from the first end plate, and the first end portion of the first end plate and the first end portion of the second end plate forming a channel for routing the air from the inlet aperture into the first, second, and third apertures of the first wall of the first rectangular ring-shaped outer plastic frame and into the first flow path portion of the first aluminum heat exchanger, and routing the air from the inlet aperture into the second flow path portion of the second aluminum heat exchanger;

a thermally conductive housing being disposed in the interior region of the battery pack housing between the battery module and the outlet aperture of the battery pack housing; the thermally conductive housing having a bottom wall and a plurality of cooling fins extending outwardly from the bottom wall and spaced apart from one another such that a third flow path portion is at least partially defined between the plurality of cooling fins, the third flow path portion communicating with the first and second flow path portions; and an electric fan disposed in the interior region of the battery pack housing; the electric fan adapted to urge the air to flow through the inlet aperture of the battery pack housing and through the first, second, and third flow path portions and further through a portion of the electric fan and through the outlet aperture of the battery pack housing.

15. The battery pack of claim 14, wherein the first and second flow path portions of the first and second aluminum heat exchangers, respectively, extend substantially parallel to the longitudinal axis of the battery module, such that the air flows substantially longitudinally through the first and second aluminum heat exchangers.

16. The battery pack of claim 14, wherein the first battery cell is a pouch-type lithium-ion battery cell having a substantially rectangular-shaped body that is disposed on and against the first aluminum heat exchanger, the second battery cell is a pouch-type lithium-ion battery cell having a substantially rectangular-shaped body that is disposed on and against the second aluminum heat exchanger.

17. The battery pack of claim 1, wherein a vertical length of the inlet aperture in the first side wall is greater than a combined vertical length of the first battery cell and the first aluminum heat exchanger.

18. The battery pack of claim 14, wherein a vertical length of the inlet aperture in the first side wall is greater than a combined vertical length of the first and second battery cells and the first and second aluminum heat exchangers.

19. The battery pack of claim 1, wherein:

the first thermally conductive plate having first and second elongated depressed portions disposed apart from another;

the second thermally conductive plate having first and second elongated depressed portions disposed apart from another; and the first and second elongated depressed portions of the second thermally conductive plate being disposed directly against the first and second elongated depressed portions, respectively, of the first thermally conductive plate such that at least a portion of the first flow path portion is defined between the first and second elongated depressed portions of the first thermally conductive plate and between the first and second elongated depressed portions of the second thermally conductive plate.

20. The battery pack of claim 14, wherein:

the first thermally conductive plate having first and second elongated depressed portions disposed apart from another;

the second thermally conductive plate having first and second elongated depressed portions disposed apart from another; and the first and second elongated depressed portions of the second thermally conductive plate being disposed directly against the first and second elongated depressed portions, respectively, of the first thermally conductive plate such that at least a portion of the first flow path portion is defined between the first and second elongated depressed portions of the first thermally conductive plate and between the first and second elongated depressed portions of the second thermally conductive plate.

* * * * *